(12) United States Patent
Jun et al.

(10) Patent No.: US 9,792,882 B2
(45) Date of Patent: Oct. 17, 2017

(54) MOBILE TERMINAL AND SCREEN SCROLL METHOD THEREIN

(71) Applicant: LG ELECTRONICS INC., Seoul (KR)

(72) Inventors: Woong Jun, Seoul (KR); Jeonghwan Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 226 days.

(21) Appl. No.: 14/516,275

(22) Filed: Oct. 16, 2014

(65) Prior Publication Data

US 2015/0116371 A1    Apr. 30, 2015

(30) Foreign Application Priority Data

Oct. 31, 2013   (KR) .................. 10-2013-0131242

(51) Int. Cl.

| G09G 5/34 | (2006.01) |
|---|---|
| G06F 3/0485 | (2013.01) |
| G06F 3/0488 | (2013.01) |
| G06F 3/0482 | (2013.01) |

(52) U.S. Cl.
CPC ............. G09G 5/34 (2013.01); G06F 3/0482 (2013.01); G06F 3/0485 (2013.01); G06F 3/0488 (2013.01); *G09G 2340/0471* (2013.01); *G09G 2354/00* (2013.01)

(58) Field of Classification Search
USPC .................................................. 345/684, 173
See application file for complete search history.

(56) References Cited

U.S. PATENT DOCUMENTS

| 2012/0212407 | A1* | 8/2012 | Tanaka ................. G06F 3/013 345/156 |
| 2012/0274665 | A1* | 11/2012 | Shimizu ............... G06F 3/0485 345/684 |
| 2015/0007016 | A1* | 1/2015 | Lee ...................... G06F 3/0482 715/234 |
| 2016/0124598 | A1* | 5/2016 | Yamahara ........... G06F 3/0482 715/830 |

* cited by examiner

Primary Examiner — Maurice L McDowell, Jr.
(74) Attorney, Agent, or Firm — KED & Associates LLP

(57) ABSTRACT

A mobile terminal and controlling method thereof are disclosed, by which a scroll speed of information displayed on a display unit can be adjusted. The present invention includes a touchscreen configured to display information, and a controller configured to control the information to be scrolled on the touchscreen at a first speed in response to a user input for scrolling the information, if a scroll of the information starts, control the first speed to be decelerated at a predetermined rate, and if a user interested information in the information is displayed as the information is scrolled, control the information to start to be scrolled at a second speed.

23 Claims, 20 Drawing Sheets

(a)

(b)

FIG. 5
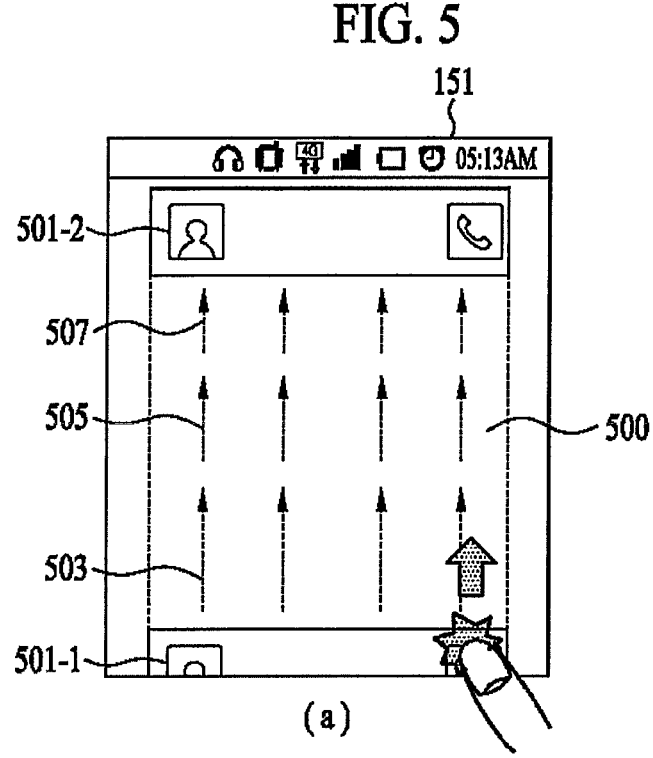
(a)
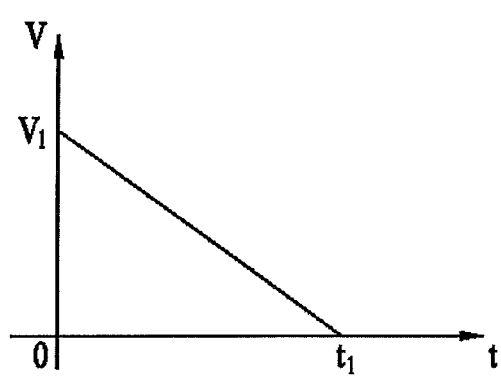
(b)

FIG. 8
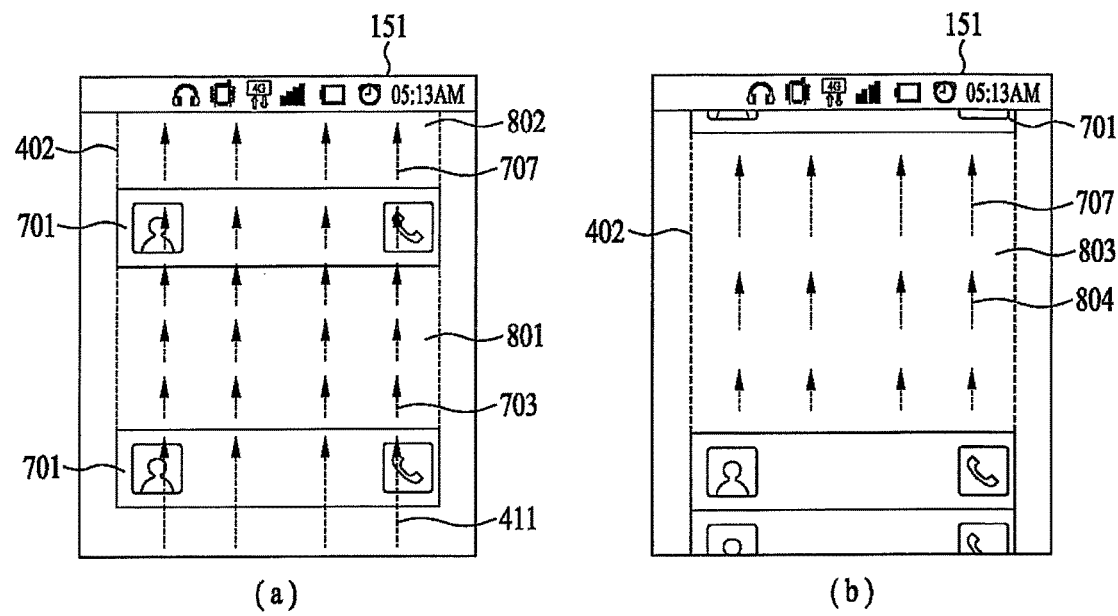
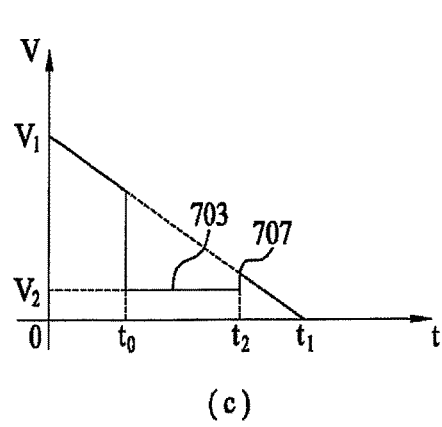
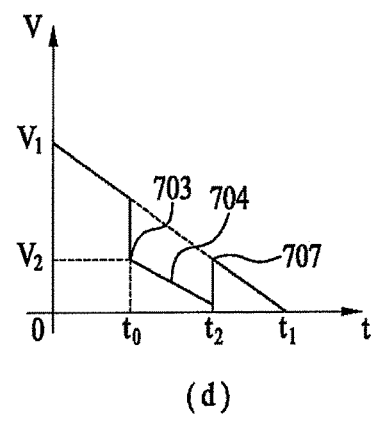

FIG. 9
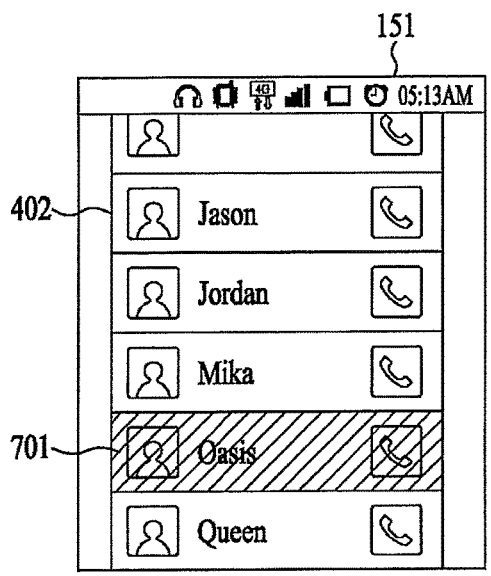
(a)
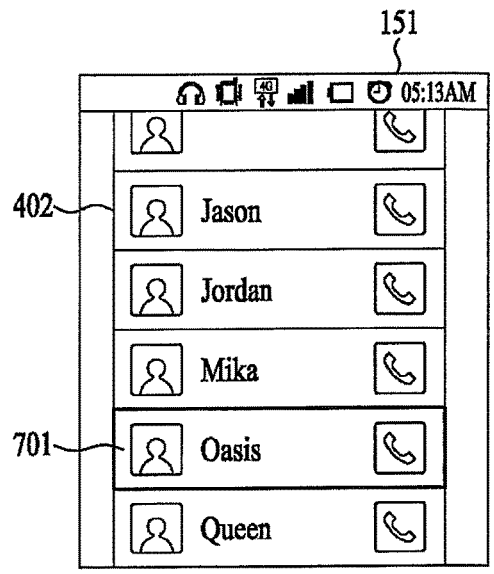
(b)
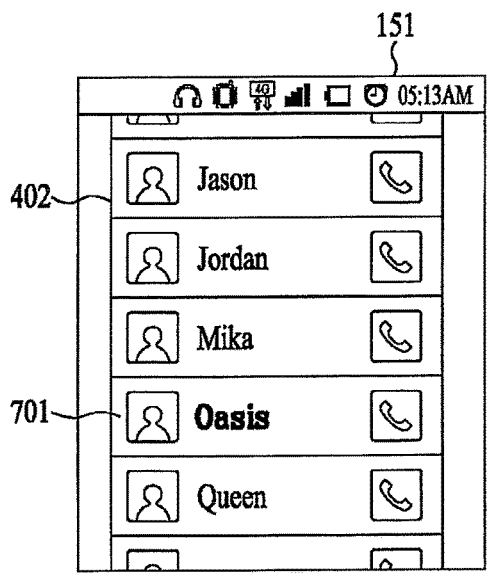
(c)
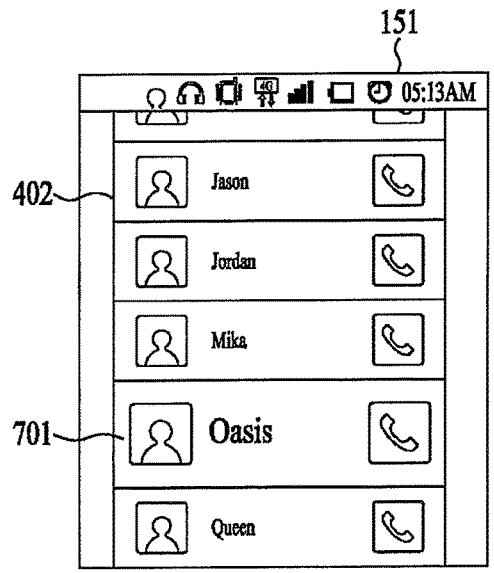
(d)

MOBILE TERMINAL AND SCREEN SCROLL METHOD THEREIN

CROSS-REFERENCE TO RELATED APPLICATION

Pursuant to 35 U.S.C. §119(a), this application claims the benefit of earlier filing date and right of priority to Korean Application No. 10-2013-0131242, filed on Oct. 31, 2013, the contents of which are hereby incorporated by reference herein in its entity.

BACKGROUND

1. Field

The present invention relates to a mobile terminal, and more particularly, to a mobile terminal and controlling method thereof. Although the present invention is suitable for a wide scope of applications, it is particularly suitable for adjusting a scroll speed of information displayed on a display unit.

2. Background

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As information communication technology has been developed recently, a mobile terminal is used to make a phone call, transceives messages, and also transceives and displays massive information. Hence, massive informations can be displayed on a display unit of the mobile terminal. Yet, the display unit of the mobile terminal has a limited display size. In order to access information of which size exceeds a displayable size of the display unit, a user should control the information to be displayed in a manner of being moved by a scroll operation.

However, when information is searched in a manner of being scrolled, the scroll actions may be frequently required depending on a location of an information desired by a user, an extent of a user's scroll input and the like in order for the user to access the desired information. Thus, in order to access the desired information, the user should perform the scroll actions too frequently and a considerably long scroll time is necessary.

In particular, when a user scrolls information slowly, the user has to search the displayed informations for a desired information one by one. And, it takes a considerable time to access the desired information. On the contrary, when a user scrolls information fast, as the information is displayed on the display unit in a manner of being moved fast, it may cause a problem that the user may miss a desired information.

SUMMARY OF THE INVENTION

Accordingly, embodiments of the present invention are directed to a mobile terminal and controlling method thereof that substantially obviate one or more problems due to limitations and disadvantages of the related art.

The present invention is proposed to solve the above-mentioned problems. And, an object of the present invention is to provide a mobile terminal and controlling method thereof, by which a user is facilitated to access a user interested information through a scroll input.

In particular, one object of the present invention is to provide a mobile terminal and controlling method thereof, by which information can be scrolled slowly. In more particular, informations displayed on a display unit are scrolled, if a user interested information included in the displayed informations is displayed on the displayed screen, the corresponding information can be scrolled slowly in a manner of adjusting a scroll speed.

Another object of the present invention is to provide a mobile terminal and controlling method thereof, by which a user is facilitated to check and access a user interested information in a manner of processing the user interested information to be visually identifiable on a display unit in the course of scrolling informations.

Further object of the present invention is to provide a mobile terminal and controlling method thereof, by which a target inputted by a user, a target detected as having user's eyes focused thereon or the like can be determined as user interested information depending on a preset condition.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen configured to display information and a controller configured to control the information to be scrolled on the touchscreen at a first speed in response to a user input for scrolling the information, if a scroll of the information starts, control the first speed to be decelerated at a predetermined rate, and if a user interested information in the information is displayed as the information is scrolled, control the information to start to be scrolled at a second speed.

In another aspect of the present invention, as embodied and broadly described herein, a mobile terminal according to the present invention may include a touchscreen configured to display information and a controller configured to control the information to start to be scrolled at a first speed while a touch drag with a predetermined strength on the touchscreen is maintained, and if a user interested information in the information is displayed as the information is scrolled, control a scroll speed of the information to be changed from the first speed into a second speed.

In further aspect of the present invention, as embodied and broadly described herein, a method of controlling a mobile terminal according to the present invention may include the steps of displaying information, scrolling the information at a first speed in response to a user input for scrolling the information, and if a user interested information in the information is displayed as the information is scrolled, scrolling the information at a second speed.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIG. 5 is a diagram for one example to describe a change of an information scrolled speed while information is scrolled;

FIG. 8 is a diagram for one example to describe a scroll speed change depending on a movement of a user interested information according to an embodiment of the present invention;

FIG. 9 is a diagram for one example to describe a visual identification processing for a user interested information according to an embodiment of the present invention;

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
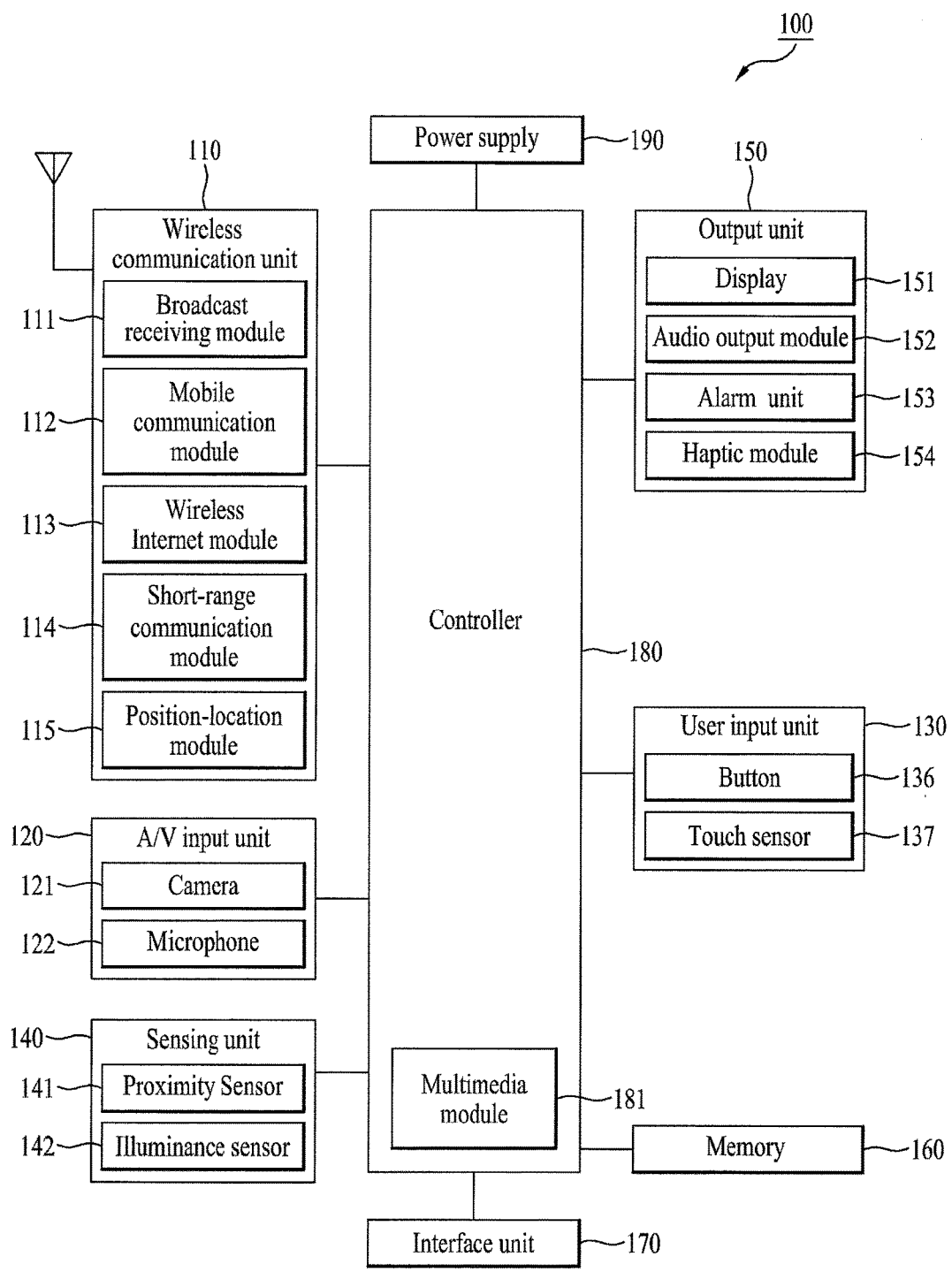
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By non-limiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
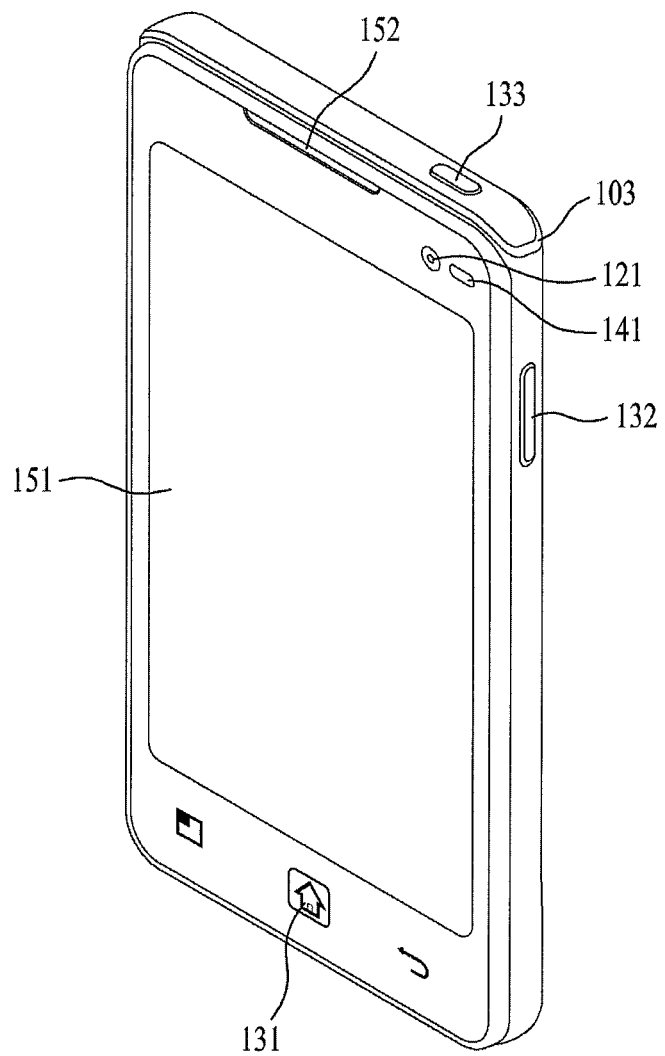
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
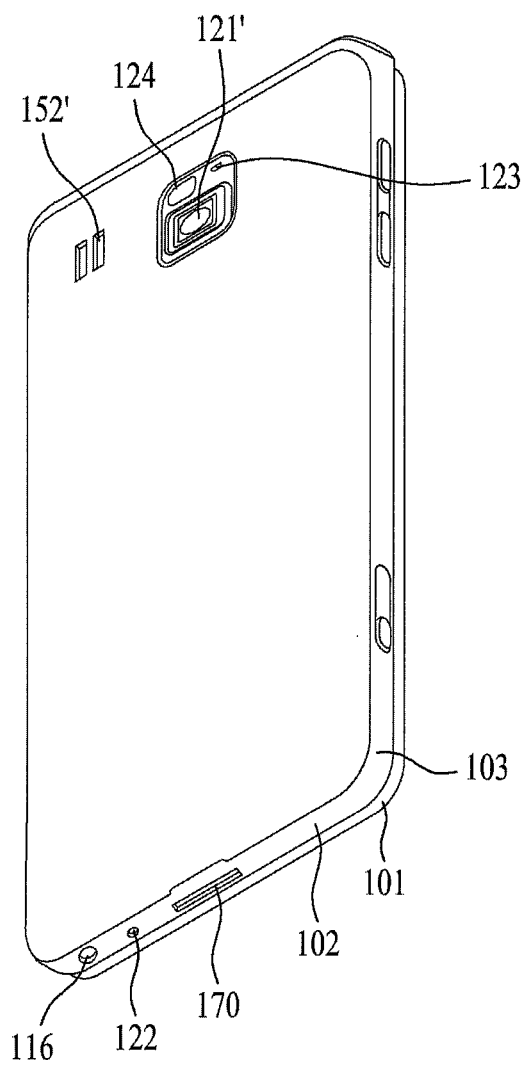
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal mentioned in the following description includes at least one of the components shown in FIG. 1. In particular, assume that a mobile terminal 100 according to the present invention includes the display unit 151 and the controller 180. In some cases, assume that the mobile terminal 100 according to the present invention can further include the proximity sensor 141. The display unit 151 of the mobile terminal 100 mentioned in the description of the present invention can be implemented with the touchscreen 151. If the display module or unit 151 is implemented with the touchscreen 151, the implementation of the present invention can be further facilitated. Hence, the present invention shall be described on the assumption that the display unit 151 includes the touchscreen 151. Moreover, if the user input unit 130 includes the touch sensor 137, the touchscreen 151 can be used as the user input unit 130.

In the present specification, 'scroll' means that an information displayed on the touchscreen 151 of the mobile terminal 100 is moved & and down or right & left.

In particular, if a size of information currently controllable by the controller 180 exceeds a size displayable through the touchscreen 151, the scroll means that a whole information already displayed on the touchscreen 151 is moved up & down or right & left through a user input.

If an information disappears by being moved in a specific direction by the scroll, a new information amounting to a size of the disappearing information appears in an opposite direction. Hence, a user can read the information displayed on the touchscreen 151 by applying a scroll input.

In the present specification, information means a target that can be scrolled by a user's input by being displayed on a displayable region of the touchscreen 151 in association with a function of the mobile terminal 100.

For instance, in case of attempting to perform a phone call or a message transmission/reception through the mobile terminal 100, the controller 180 detects a user's input and is then able to control a contact list in a phone book to be displayed on the touchscreen 151. In this case, the contact list displayed on the touchscreen 151 can be included in the information of the present invention. Moreover, when a user accesses a website through the mobile terminal 100, a webpage screen provided by a website provider is displayed on the touchscreen 151. In this case, the webpage screen displayed on the touchscreen 151 can be included in the information of the present invention.

Contents including various texts, images videos and the like, which can be displayed on the touchscreen 151 and scrolled by a user's scroll input by being saved in the memory 160 of the mobile terminal 100 or being received through the wireless communication unit 110, can correspond to the information of the present invention as well.

Particularly, the information of the present invention can include an activation screen, which is displayed on the touchscreen 151, of one of various applications including an email, an SNS, a music/video player and the like. In this case, each of the various applications can provide a user interface that can be scrolled by a user input. In particular, the user interface can be provided through the touchscreen 151 in a manner of arranging the information in a list or paragraph format.

The information of the present invention can include icons of various applications displayed on a home screen of the mobile terminal 100 or an application list screen. Particularly, in this case, the information can be scrolled in right and left directions.

In the present specification, a user interested information means a target that is inputted or selected by a user plural times more than a predetermined count on the basis of a reference previously set before an information scroll according to an embodiment of the present invention. And, a target activated by a user input or selection can become a user interested information.

For instance, in case that an information of the present invention is a contact list, an information related to a contact on which a user frequently performs a message transmission/reception or a phone call can become a user interested information. In particular, if a user inputs a contact of 'A' over a predetermined count in order to make a phone call to a counterpart named 'A', the controller 180 can determine an item for 'A' on a contact list as a user interested information. In case that 'A' is selected as a message transmission target over a predetermined count from a contact list, the controller 180 can determine an item for 'A' as a user interested information. In case that a phone call function or a message transceiving function is activated several times over a predetermined count in association with 'A' through the mobile terminal 100, the controller 180 can determine an item for 'A' as a user interested information.

Meanwhile, according to the above examples, a case that a user interested information is included in an information in a single contact list is taken as an example. Yet, a user interested information is non-limited by an information in a contact list.

For instance, if an information of the present invention is a page provided by an internet portal site, a user interested information may exist in numerous informations included in the page. In this case, the controller 180 is able to determine a search target, which is inputted by a user over a predetermined count before scrolling the page, or a hyperlink selected by the user as a user interested information. In particular, in case that the internet portal site includes a search window, if a user performs a search for a character A over a predetermined count, the controller 180 can determine a text 'A' as a user interested information. If a user selects another page different from the aforementioned page through a web browser, the controller 180 can control the different page to be displayed through the touchscreen 151. In this case, the different page can become the information of the present invention as well. And, an information containing a text 'A' on the different page can correspond to a user interested information for the different page as well. In particular, a user interested information included in a specific information can be handled as a user interested information for a different information as well.

Moreover, a user interested information can be shared between different applications. Like the above example, if a user performs a search for a character 'A' over a prescribed count through a search window of an internet portal site, a text 'A' is determined as a user interested information and can be applied to a different application.

For instance, after a text 'A' has been determined as a user interested information, if a user activates a music player application, the controller 180 can control a music list, which can be played through the music player, to be displayed on the touchscreen 151. The music list corresponds to an information of the present invention. And, the music list can include a title and artist name per music. In this case, if the artist name is identical to the text 'A' or includes the text 'A', the controller 180 can handle the text 'A; as a user interested information in the music list of the music player application.

A method for the controller 180 to determine a user interested information or a method for the controller 180 to control the user interested information in a state that each information is displayed through the touchscreen 151 shall be described in detail later.

According to the present invention, a speed of scrolling the information varies depending on whether the user interested information is displayed on the touchscreen 151.

In particular, if a user interested information is not displayed on the touchscreen 151, the controller 180 controls information to be scrolled in response to a user's scroll input. In doing so, a speed of starting to scroll the information shall be named a first speed hereinafter. On the other hand, if a user interested information is displayed on the touchscreen 151, the controller 180 controls information to be scrolled at a speed different from the first speed in response to a user's scroll input. In this case, the speed different from the first speed shall be named a second speed hereinafter. In particular, as the controller 180 detects that the user interested information is displayed on the touchscreen 151, the controller 180 controls information to be scrolled at the second speed.

According to the present invention, a scroll input can include a user's touch gesture applied to the touchscreen 151.

In this case, the touch gesture means an input action inputted through the touchscreen 151 by a user to manipulate the mobile terminal 100. The controller 180 is able to recognize the user's touch gesture inputted through the touchscreen 151 as a command for manipulating the mobile terminal 100. Types of the touch gesture may include a user's touch input to a specific point on the touchscreen 151, a tab action, a flick action, a touch drag action for drawing a specific trace, and the like. An input of the touch gesture may include a finger touch input using user's finger or a touch input using an electronic pen. If any pointer enables the touchscreen 151 to recognize an input through the touch sensor, it can be used as a pointer for the touch gesture. Particularly, according to one embodiment of the present invention, if a flick action or a drag input is applied to the touchscreen 151, information displayed on the touchscreen 151 can be scrolled.

The first speed of starting to scroll information is described with reference to a type of the touch gesture as follows. First of all, if a user's scroll input includes a flick input, it is able to determine a first speed in consideration of at least one of a touch speed and a moving distance of a pointer brought into contact with the touchscreen 151. Moreover, if a user's scroll input includes a drag input, it is able to determine a first speed in proportion to a moving distance of a pointer brought into contact with the touchscreen 151.

In the following description, an embodiment of the present invention is explained in detail with reference to FIGS. 4 to 20.

Figure 4:
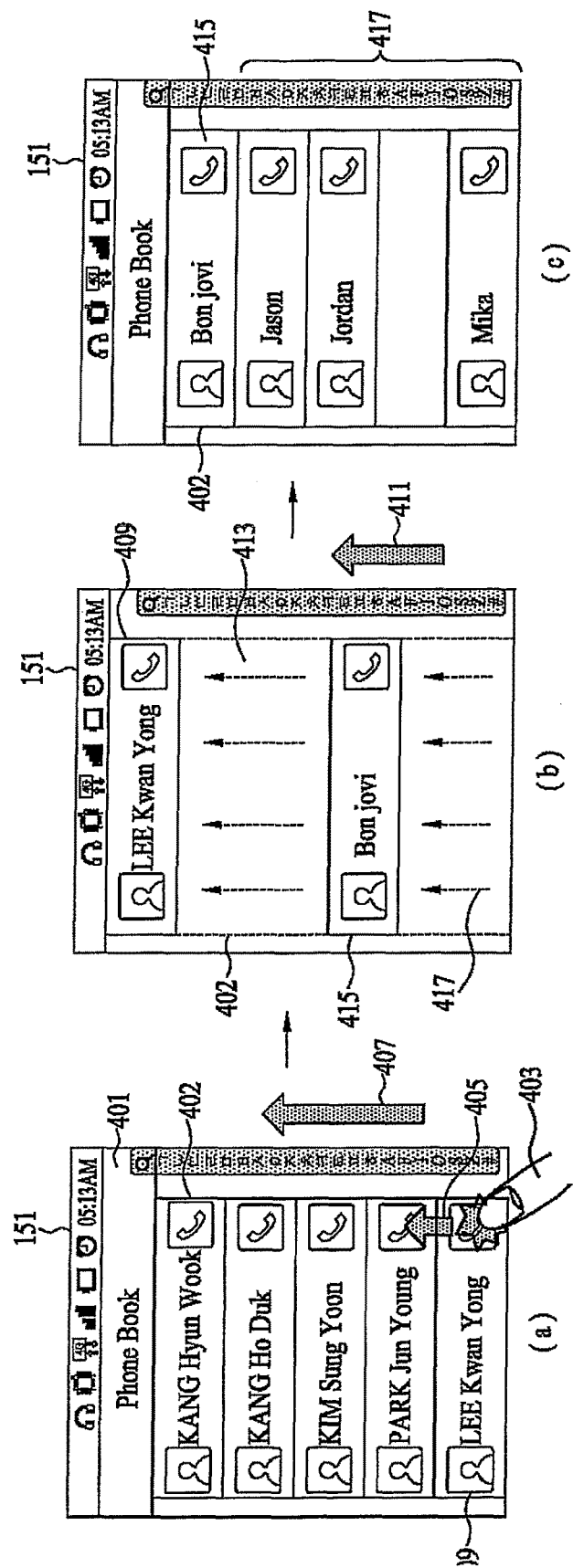
FIG. 4 is a diagram for one example to describe that a displayed information is changed if information is scrolled by a scroll input.

FIG. 4 is a diagram for one example to describe that a displayed information is changed if information is scrolled by a scroll input. In particular, in FIGS. 4 to 12, a phone book list is illustrated as one example of an information scrolled according to an embodiment of the present invention and a flick action is illustrated as one example of a touch gesture.

If the controller 180 detects a flick input, the controller 180 can control a process for scrolling an information to be displayed on the touchscreen 151. And, the controller 180 can control the information to be displayed in a manner of changing at least one of a scrolled speed and a scrolled distance depending on a strength of the detected flick input. In particular, each time a flick input is detected, the controller 180 detects a strength of the flick input so as to control the information to be scrolled at the same speed and in the same distance with prescribed magnification for the same strength. In this case, the prescribed magnification can be determined by a user or manufacturer setup. An information scroll by a flick input has a prescribed resistance depending on a user setup or a manufacturer setup. In particular, the controller 180 controls a scroll of an information to be initiated by detecting a flick input and is also able to control a scroll speed to be lowered in response to a prescribed resistance. A scroll speed is decelerated at a predetermined rate by a prescribed resistance until converging into 0. Hence, the controller 180 can control a scroll of information to be stopped. In this case, the prescribed resistance can be determined by a user or manufacturer setup.

FIG. 4 (a) shows the moment of starting a scroll of a phone book list. FIG. 4 (b) shows a state of scrolling the phone book list. And, FIG. 4 (c) shows a state that the scroll of the phone book list is stopped.

Referring to FIG. 4 (a), the controller 180 can control a phone book 401 to be displayed on the touchscreen 151 in response to a user's input. If the user performs a scroll input with a touch gesture 403, the controller 180 can control a list 402 of the phone book 401 to be scrolled in a direction 405 of the touch gesture 403. In FIG. 4 (a), a scroll direction of the list 402 by a flick input 403 is a direction 405 toward a top end of the touchscreen 151 and a scroll start speed is visualized as an arrow 407.

After the scroll of the list 402 has been started at the speed 407 in the direction 405 by the flick input 403 [FIG. 4 (a)], the controller 180 can control a process for scrolling the list 402 to be displayed on the touchscreen 151 [FIG. 4 (b)]. In the example shown in FIG. 4 (b), a contact 409 located at a bottom end of the list 402 shown in FIG. 4 (a) is moved in the scroll direction 405 and then displayed on a top end of the touchscreen 151. As mentioned in the foregoing description, when the list 402 is scrolled, a scroll speed is decelerated by a prescribed resistance. Yet, the scroll of the list 402 is not stopped unless the scroll speed gets 0. And, the scroll of the list 402 continues until the scroll speed gets 0. Thus, as the process for scrolling the list 402 continues, the controller 180 can control the contact 409 displayed on the top end of the touchscreen 151 to disappear from the touchscreen 151.

In FIG. 4 (b), a process for scrolling to move contacts between the contact 409 and a contact 415 is schematically illustrated as a region 413. Moreover, in FIG. 4 (b), a process for scrolling to display contacts below the contact 415 on the touchscreen 151 is schematically illustrated as a region 417. A length of an arrow shown in the region 417 is shorter than that of an arrow shown in the region 413, which visually represents deceleration of the scroll speed of the list 402.

As mentioned in the foregoing description, the scroll speed of the list 402 by the flick input 403 is decelerated at a predetermined rate depending on a prescribed resistance. An arrow 411 shown in FIG. 4 (b) indicates that a scroll speed is decelerated in comparison with the scroll start speed 407 shown in FIG. 4 (a). In this case, the predetermined rate is the rate for the controller 180 to decelerate a scroll speed when an information is scrolled by a general scroll input.

Figure 14:
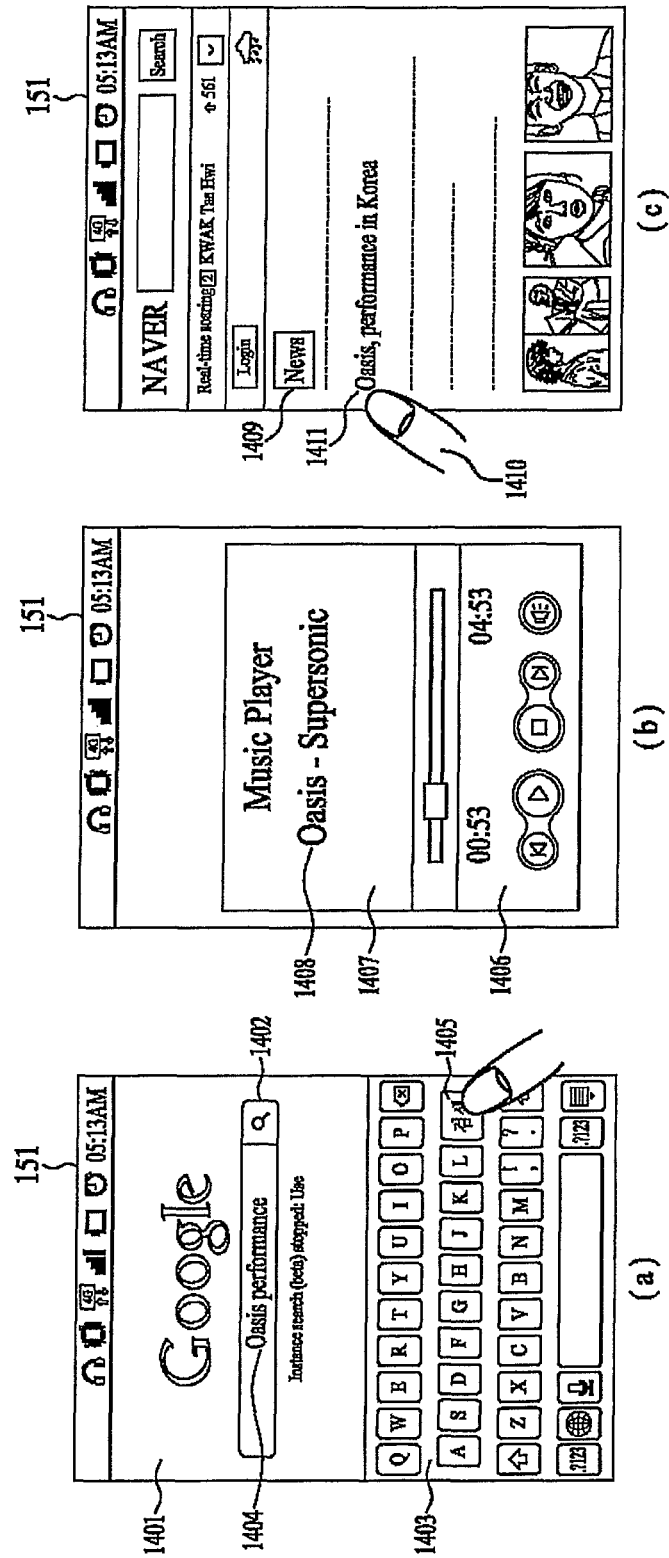
FIG. 14 is a diagram for one example to describe a process for inputting a specific information and performing a task related to the specific information according to an embodiment of the present invention.

In FIG. 4 (c), if the scroll speed becomes 0, the controller 180 can control a stopped state of the list 402 to be displayed through the touchscreen 151. Referring to FIG. 14 (c), the contact 415 is located at a top end of the touchscreen 151. And, the region 417 displayed on the touchscreen 151 by being scrolled is located below the contact 415.

FIG. 5 is a diagram for one example to describe a change of an information scrolled speed while information is scrolled.

Referring to FIG. 5 (a), the controller 180 detects a user's flick input 403 and is then able to control a list 500 to be scrolled in a direction 405 toward a top end of the touchscreen 151. In order to describe a change of an information scrolled speed, the list 500 is schematically illustrated in FIG. 5 (a).

As the list 500 is scrolled by the flick input 403 shown in FIG. 5 (a), a process for a contact 501-1, which was located at a bottom end of the touchscreen 151 before the flick input 403, to be moved to the top end of the touchscreen 151 is shown in FIG. 5 (a). In particular, FIG. 5 (a) is a diagram for one example to describe a scroll speed change while a contact is moving to the top end of the touchscreen 151 from the bottom end of the touchscreen 151. In FIG. 5 (a), a strength of the flick input 403 corresponds to a strength for scrolling the list 500 to the top end of the touchscreen 151 from the bottom end of the touchscreen 151.

In doing so, as the contact 501-1 passes through regions 503, 505 and 507, the controller 180 controls the scroll speed to be decelerated gradually. And, the controller 180 is also able to control the scroll speed to become 0 when a contact 501-2 reaches the top end of the touchscreen 151. A length of an arrow indicated in each of the regions 503, 505 and 507 visually represents the scroll speed when the contact 501-1 passes through the corresponding region. In particular, as the contact 501-1 moves toward the region 507 from the region 503, the scroll speed gets decelerated.

FIG. 5 (b) is a graph to describe that a scroll speed is decelerated by a prescribed resistance when the list 500 shown in FIG. 5 (a) is scrolled.

In the graph shown in FIG. 5 (b), a vertical axis indicates a scroll speed v and a horizontal axis indicates a time t for scrolling the list 500. When a scroll of the list 500 is started by the flick input 403 in FIG. 5 (a), assume that t=0 and v=v1. In this case, the contact 501-1 shown in FIG. 5 (a) starts to move toward the region 503 from the bottom end of the touchscreen 151 by being scrolled. The graph shown in FIG. 5 (b) has a predetermined slope value. And, the slope value indicates that the scroll speed is reduced at a predetermined rate. As the scroll of the list 500 proceeds, when the contact 501-2 is located at the top end of the touchscreen 151 and the scroll is stopped, t=t1 and v=0. In particular, it can be observed that a time taken for the contact 501-1 to stop at the top end 501-2 of the touchscreen 151 by moving from the bottom end of the touchscreen 151 to the top end of the touchscreen 151 is t1. In more particular, referring to FIG. 5 (a) and FIG. 5 (b), as the list 500 is scrolled, the contact 501-1 enters the region 503 from an initial location, passes through the region 505 and the region 507, and then stops at the final location 501-2 at t=t1.

Figure 6:
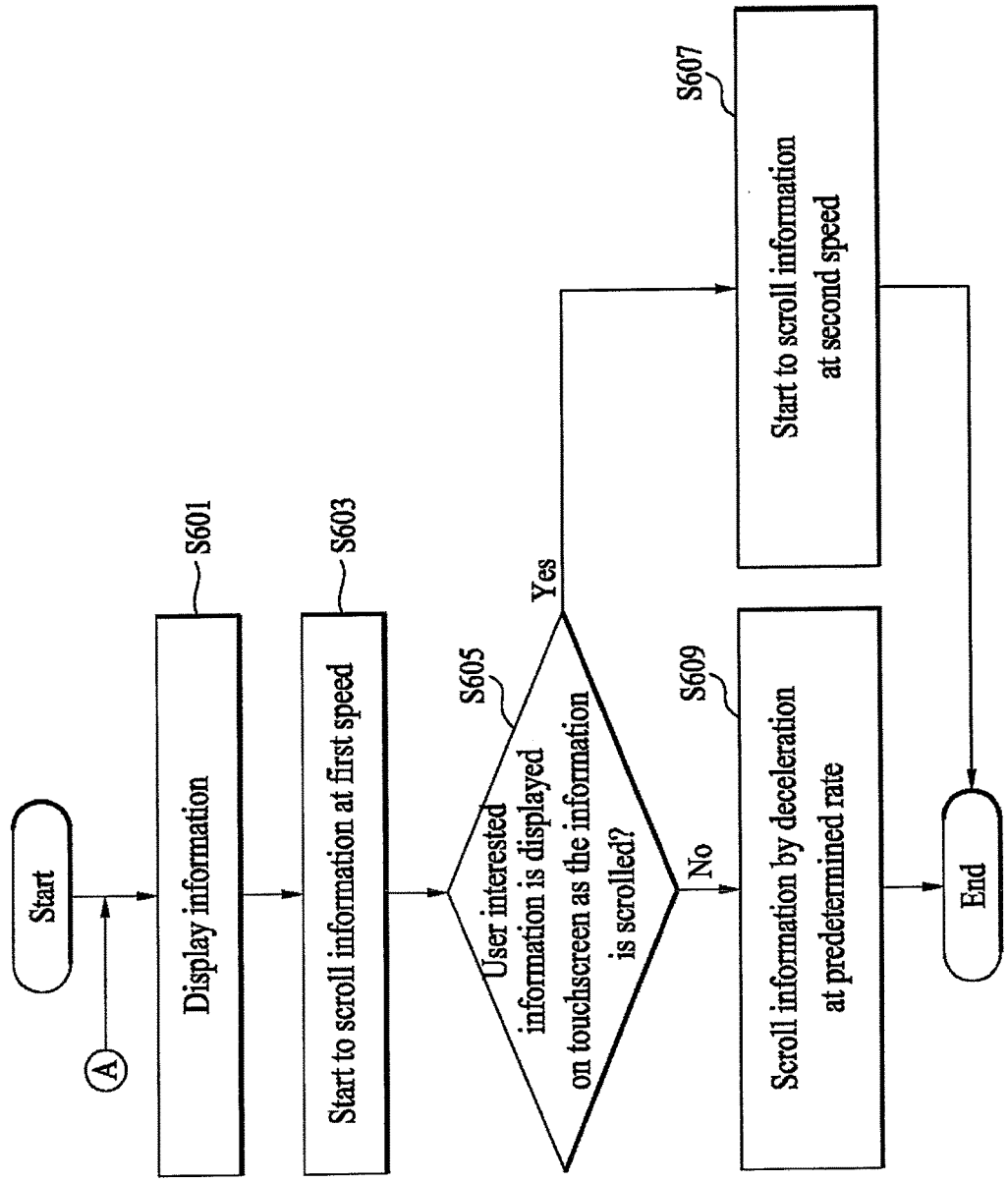
FIG. 6 is a flowchart for an operation of a mobile terminal according to the present invention.
Figure 7:
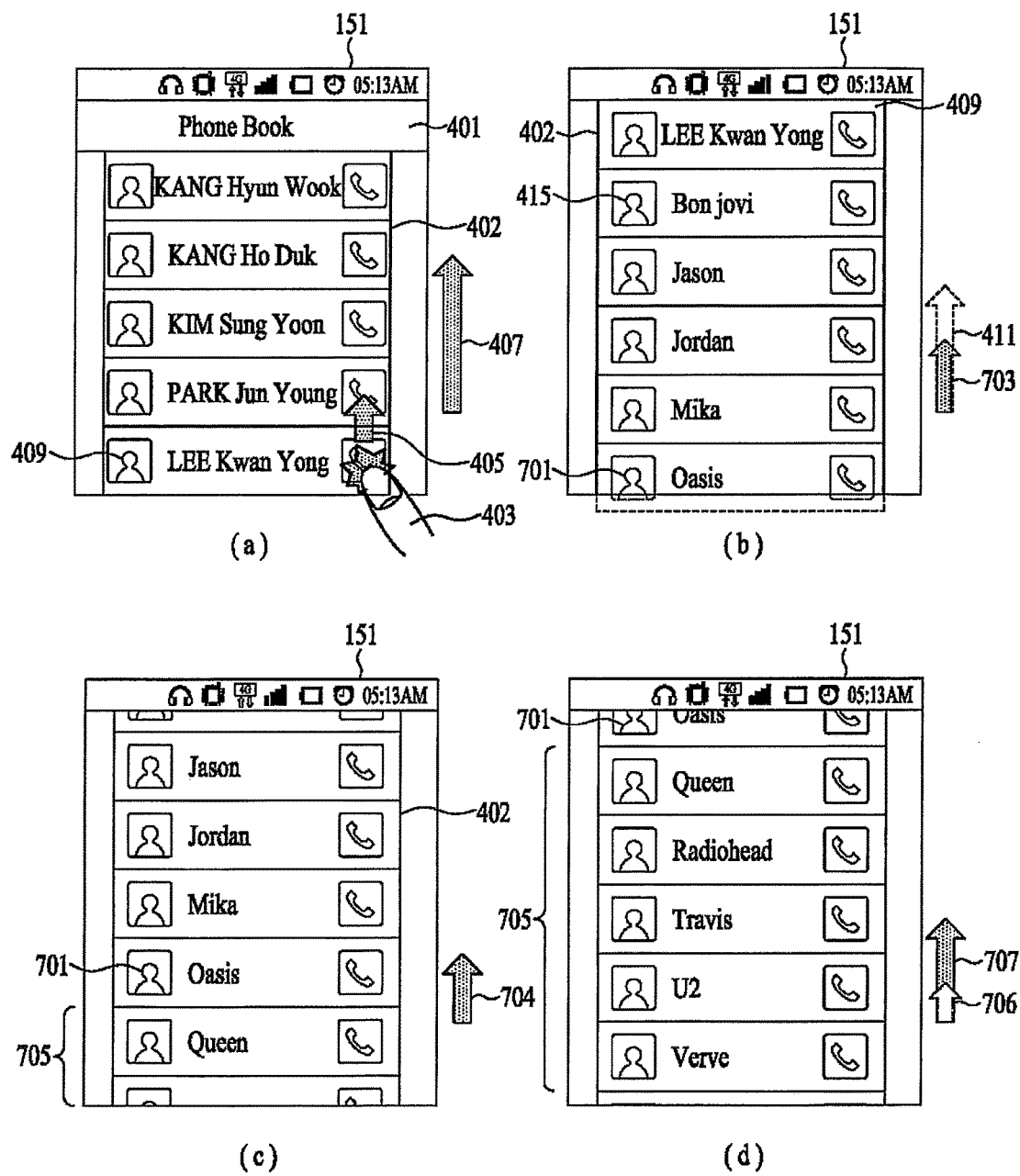
FIG. 7 is a diagram for one example to describe that a scroll speed of information decreases when a user interested information is displayed on a display unit according to an embodiment of the present invention.

FIG. 6 is a flowchart for an operation of a mobile terminal according to the present invention. And, FIG. 7 is a diagram for one example to describe that a scroll speed of information decreases when a user interested information is displayed on a display unit according to an embodiment of the present invention.

Referring to FIG. 6, the controller 180 can control an information to be displayed through the touchscreen 151 [S601]. In FIG. 7 (a) to 7 (d), a list 402 of a phone book 401 is displayed on the touchscreen 151.

If a user's scroll input is detected, the controller 180 can control an information to start to be scrolled at a first speed [S603]. In doing so, the controller 180 can control a process for scrolling the information to be displayed on the touchscreen 151. Referring to FIG. 7 (a), like the drawing shown in FIG. 4 (a), the list 402 is scrolled in a direction 405 at a speed 407 by a scroll input 403. And, the first speed is represented as a scroll start speed 407.

As the information is scrolled, the controller 180 can determine whether a user interested information is displayed on the touchscreen 151 [S605]. In the following description with reference to FIG. 7 (b), a case that a contact 701 is a user interested information of the present invention is taken as an example.

If the user interested information is not displayed on the touchscreen 151, the controller 180 can control the information to be scrolled in a manner of being decelerated at a predetermined rate [S609].

Referring to FIG. 7 (b), as the list 402 is scrolled, the controller 180 can control a contact 409, which is located at a bottom end of the touchscreen 151 in FIG. 7 (a), to move to a top end of the touchscreen 151. Before the contact 701 corresponding to the user interested information is displayed on the touchscreen 151, like the scroll speed 411 shown in FIG. 4 (b), the controller 180 can control the first speed to be decelerated at a predetermined rate. As the first speed is decelerated at the predetermined rate, referring to FIG. 7 (b), a decelerated speed is denoted by a dotted line 411 in the same length of the former scroll speed 411 shown in FIG. 4 (b).

As the scroll of the list 402 proceeds, if the contact 701 appears on the touchscreen 151, the controller 180 can detect that the user interested information is displayed. As the scroll of the list 402 continues to proceed, in order to describe the moment that the contact 701 appears on the touchscreen 151, regions other than a part of the contact 701 appearing on the touchscreen 151 are denoted by a dotted line.

If the user interested information is detected as appearing on the touchscreen 151, the controller 180 can control the list 402 to start to be scrolled at a second speed different from the first speed [S607]. Particularly, referring to FIG. 7 (b), the second speed 703 for starting to scroll the contact 701 is lower than the speed of the list 402 decelerated at the predetermined rate by starting to be scrolled at the first speed. In particular, the second speed is lower than a speed of an information decelerated by the controller 180 at a predetermined rate by being scrolled at the first speed. Hence, if the list 402 starts to be scrolled at the second speed, the list 402 is scrolled slower than the case that the list 402 is decelerated at the predetermined rate by starting to be scrolled at the first speed.

As the user interested information is displayed on the touchscreen 151, if the list 402 starts to be scrolled at the second speed, the controller 180 can control the contact 701 to be scrolled at the second speed until the contact 701 displayed on the touchscreen 151 disappears from the touchscreen 151. And, the controller 180 can control the second sped to be decelerated at a predetermined rate in accordance with a user or manufacturer setup [S609]. In particular, like the scroll by the flick input 403 is decelerated at a predetermined rate by a prescribed resistance [FIG. 4 (b)], the second speed is decelerated at the predetermined rate. Referring to FIG. 7 (c), the contact 701 corresponding to the user interested information has started to be scrolled at the second speed and is then moving toward the top end of the touchscreen 151. And, other contacts 705 are scrolled to appear below the contact 701 on the touchscreen 151. In doing so, if the second speed is set to be decelerated at a predetermined rate, the controller 180 can control the scroll speed of the list 402 to reach a speed 704 in a manner of being decelerated from the second speed 703 at the predetermined rate. On the contrary, if the second speed 703 is set not to be decelerated, the controller 180 controls the scroll speed of the list 402 to be maintained at the second speed 703. In this case, the speed 704 is equal to the speed 703.

If the second speed is set to be decelerated at a predetermined rate, the controller 180 controls the second speed to be decelerated at the predetermined rate. And, the controller 180 can also control the scroll to continue unless the scroll speed becomes 0. FIG. 7 (d) shows the moment at which the contact 701 corresponding to the user interested information to disappear from the touchscreen 151. And, other contacts 705 are displayed below the contact 701 on the touchscreen 151. As the contact 701 appears on the touchscreen 151, the controller 180 controls a scroll to start at the second speed [FIG. 7 (c)]. And, the controller 180 is then able to control the speed of the scroll, which has started at the second speed, to be decelerated at the predetermined rate until the contact 701 disappears from the touchscreen 151 [FIG. 7 (d)]. Since the controller 180 controls the speed 704 shown in FIG. 7 (c) to be decelerated at the predetermined rate until the contact 701 at a location shown in FIG. 7 (c) disappears from the touchscreen 151, a speed 706 is the speed decelerated from the speed 704 at the predetermined rate.

Thereafter, if the contact 701 completely disappears from the touchscreen 151, the controller 180 restores the scroll speed of the list 402 into a speed 707. In this case, the speed 707 is the scroll speed resulting from the first speed 407 decelerated at a predetermined rate in the course of scrolling the displayed information shown in FIG. 7 (a) by the flick input 403 by the displayed information shown in FIG. 7 (d). In particular, when the contact 701 corresponding to the user interested information is not displayed on the touchscreen 151, if the controller 180 decelerates the first speed 407 at the predetermined rate in the course of scrolling the list 402 from the screen shown in FIG. 7 (a) to the screen shown in FIG. 7 (d), the scroll speed can become the speed 707.

Meanwhile, it is apparent that the speed 707 is decelerated at the predetermined rate as the scroll continues thereafter.

FIG. 8 is a diagram for one example to describe a scroll speed change depending on a movement of a user interested information according to an embodiment of the present invention.

In a process shown in FIG. 8 (a) and FIG. 8 (b), a contact 701 corresponding to a user interested information is scrolled from a bottom end of the touchscreen 151 to a top end of the touchscreen 151 by being scrolled in a direction of the top end of the touchscreen 151 and then disappears from the touchscreen 151.

Referring to FIG. 8 (a), the controller 180 can detect that a contact 701 appears from a bottom end of the touchscreen 151. In doing so, the contact 701 appears, as shown in FIG. 4 (*b*), in a manner of being scrolled at a speed 411 resulting from decelerating a scroll start speed 407 at a predetermined rate. If the controller 180 detects that the contact 701 is displayed on the touchscreen 151, the controller 180 can control a speed of scrolling a list 402 to be changed into a speed 703 from the speed 411. As mentioned in the foregoing description with reference to FIG. 7 (*b*), the speed 703 corresponding to a second sped is lower than the speed 411.

A region 801 indicates a region in which the contact 701 is scrolled on the touchscreen 151. The controller 180 can control a speed of scrolling the contact 701 to be maintained at the speed 703 corresponding to the second speed in the region 801. Moreover, the controller 180 can control the second speed 703 to be decelerated at a predetermined rate in accordance with settings [not shown in the drawing]. Meanwhile, a region 802 located above the former region 801 is the region in which contacts scrolled ahead of the contact 701 are located. As mentioned in the foregoing description with reference to FIG. 7 (*d*), the controller 180 can control the contacts included in the region 802 to be scrolled at the speed 707.

Referring to FIG. 8 (*b*), a region 803 is the region in which other contacts located below the contact 701 are scrolled when the contact 701 disappears from the touchscreen 151. When the contact 701 scrolled at the second speed disappears from the touchscreen 151, as mentioned in the foregoing description with reference to FIG. 7 (*d*), the controller 180 can control other contacts included in the region 803 to be scrolled at the speed 707. Moreover, in the course of scrolling the contacts included in the region 803, the controller 180 can control the speed 707 to be decelerated at a predetermined rate. In doing so, in case that the speed 707 is decelerated at the predetermined rate, a speed of scrolling the list 402 is represented as a speed 804.

FIG. 8 (*c*) and FIG. 8 (*d*) are graphs to describe a scroll speed change until a user interested information appears on the touchscreen 151 and then disappears from the touchscreen in accordance of scrolling information as shown in FIG. 8 (*a*) and FIG. 8 (*b*). In FIG. 8 (*c*) and FIG. 8 (*d*), a first speed corresponding to a scroll speed on starting a scroll of information is represented as v1 and a second speed corresponding to a scroll speed on detecting by the controller 180 that the user interested information is displayed on the touchscreen 151 is represented as v2. When the user interested information appears on the touchscreen 151, a corresponding time is represented as t0. When the user interested information disappears from the touchscreen 151, a corresponding time is represented as t2. And, t1 indicates a time when the scroll is stopped.

Referring to FIG. 8 (*c*), information starts to be scrolled at a speed v1. Since a scroll be a flick input is decelerated at a predetermined rate by a prescribed resistance, a speed in the graph is reduced with a predetermined slope. When a contact 701 appears on the touchscreen 151, as shown in FIG. 8 (*a*), it is t=t0 and the speed is changed to v2 from v1. In doing so, referring to FIG. 8 (*a*), the scroll speed corresponds to the speed 703. Thereafter, the scroll speed is uniformly maintained as the speed v2 and is then raised to the speed 707 at t2. In this case, as shown in FIG. 8 (*b*), the t2 corresponds to a time when the contact 701 disappears from the touchscreen 151. And, the speed 707 is the scroll speed when the speed v1 is decelerated at a predetermined rate until t=t2.

Once the contact 701 disappears from the touchscreen 151, the speed 707 is decelerated at a predetermined rate and the list 402 is eventually stopped on the touchscreen 151. In particular, as the scroll speed of the information is gradually decelerated, the scroll speed v=0 at t=t1.

FIG. 8 (*d*) is a diagram to describe a case that the controller 180 decelerates the second speed at a predetermined rate in accordance with settings. Referring to FIG. 8 (*d*), when t=t0, the second speed v2 starts to be decelerated at the same rate of decelerating the first speed v1. In FIG. 8 (*d*), as mentioned in the foregoing description with reference to FIG. 7 (*c*), the speed resulting from decelerating the second speed v2 at the predetermined rate is represented as a speed 704.

FIG. 9 is a diagram for one example to describe a visual identification processing for a user interested information according to an embodiment of the present invention. As information is scrolled, the controller 180 can detects that a user interested information is displayed on the touchscreen 151 and is able to control the user interested information to be processed into being visually identifiable. In particular, when the controller 180 processes the user interested information into being visually identifiable, FIG. 9 shows one example of an identification processing effect displayed on the touchscreen.

In the following descriptions with reference to FIG. 9 (*a*) to 9 (*d*), assume that the controller 180 detects that a contact 701 corresponding to a user interested information is displayed on the touchscreen 151.

Referring to FIG. 9 (*a*), the controller 180 can control a cell corresponding to a contact 701 to be displayed in a manner of being shaded. Alternatively, the controller 180 can control the cell to be displayed in a manner of having a background color different from that of another cell of a list 402. Moreover, referring to FIG. 9 (*b*), the controller 180 can control an outline of the cell to be displayed thick to be identifiable from other cells of the list 402. Furthermore, referring to FIG. 9 (*c*), the controller 180 can control a content of the cell corresponding to the contact 701 to be displayed in a manner of being emphasized. In the present specification, the visual identification processing on the contact 701 shown in FIG. 9 (*a*) to 9 (*c*) shall be named a highlight effect.

FIG. 9 (*d*) is a diagram for one example to describe an enlargement effect included in the visual identification processing. Referring to FIG. 9 (*d*), the controller 180 can control the cell corresponding to the contact 701 to be enlarged to have a cell size greater than that of another cell of the list 402. In particular, in FIG. 9 (*d*), the cell corresponding to the contact 701 is enlarged in a length direction. When the enlargement effect is applied in accordance with a user or manufacturer setup, the controller 180 can control a content included in the cell to be displayed in a manner of being enlarged as well.

Figure 10:
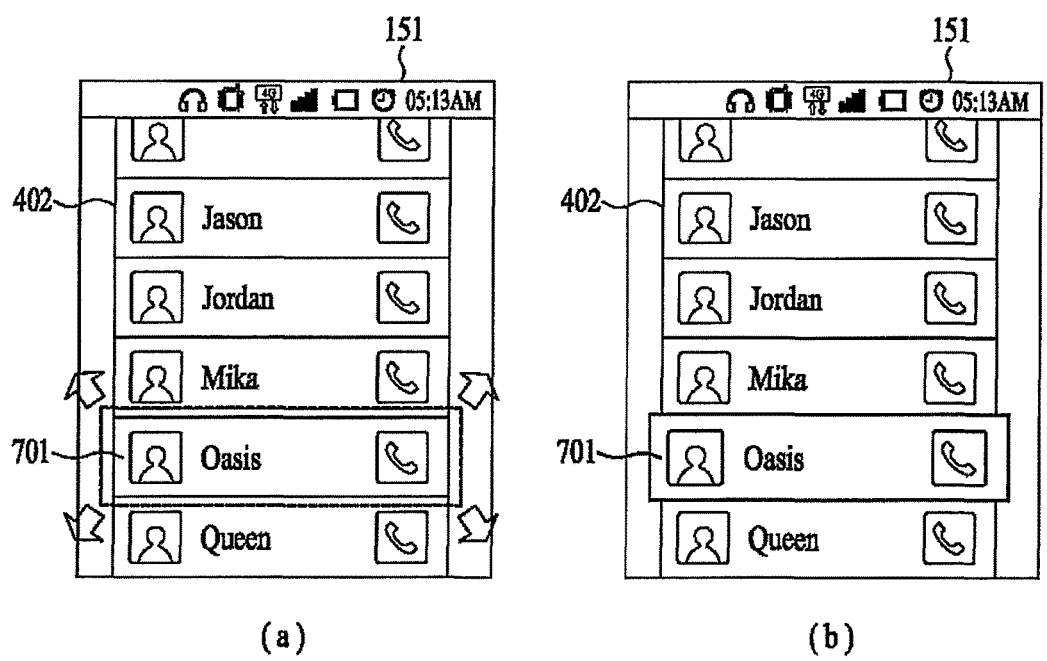
FIG. 10 is a diagram for one example to describe a popup effect for a user interested information according to an embodiment of the present invention.

FIG. 10 is a diagram for one example to describe a popup effect for a user interested information according to an embodiment of the present invention. In particular, like FIG. 9, FIG. 10 shows one example of an identification processing effect displayed on the touchscreen 151 when the controller 180 processes a user interested information to become visually identifiable.

Referring to FIG. 10 (*a*), the controller 180 can detect that a contact 701 corresponding to a user interested information is displayed on the touchscreen 151. Hence, the controller 170 can control a process for enlarging the contact 701 in all directions on a list 402 to be displayed. In particular, the controller 180 can control the contact 701 to be displayed on the list 402 in a manner of popping up in a direction of a front side of the touchscreen 151. Referring to FIG. 10 (*b*), as the contact 701 is enlarged in all directions in FIG. 10 (*a*), the popup is completed. In accordance with a user or manufacturer setup, when the popup effect is applied, the controller 180 can control the contact 701 to pop up in a manner of overlapping regions of other contacts adjacent to the contact 701 in part.

Meanwhile, it is able to determine which one of the visual identification processing methods in accordance with the user or manufacturer setups described with reference to FIG. 9 and FIG. 10 shall be applied. Accordingly, the controller 180 can control a user interested information to be identifiably processed by one of the visual identification processing methods.

Figure 11:
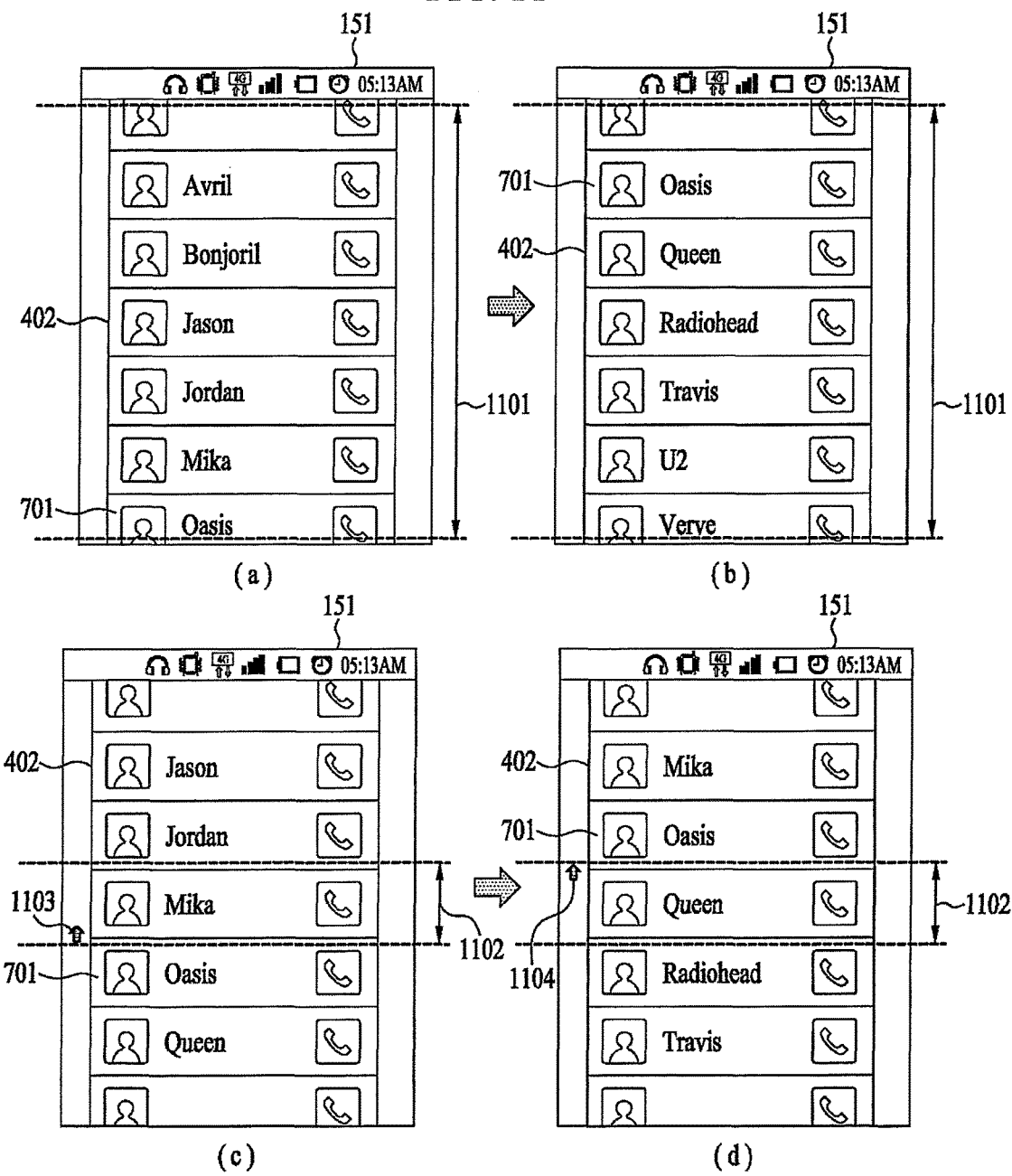
FIG. 11 is a diagram for one example to describe a region for adjusting a moving speed of a user interested information according to an embodiment of the present invention.

FIG. 11 is a diagram for one example to describe a region for adjusting a moving speed of a user interested information according to an embodiment of the present invention. In FIG. 11, assume that a list 402 is scrolled in a direction of a top end of the touchscreen 151.

According to the former embodiments described with reference to FIG. 7 and FIG. 8, as information is scrolled at a first speed, if it is detected that a user interested information is displayed on the touchscreen 151, the controller 180 can control the information to be scrolled at a second speed. In particular, the controller 180 is able to control the information to be scrolled at the second speed until the user interested information having appeared on the touchscreen 151 disappears from the touchscreen 151. In doing so, a region from which the controller 180 detects that the user interested information is displayed is a full region of the touchscreen 151.

On the other hand, as information is scrolled, the controller 180 may be able to detect whether a user interested information is displayed on the touchscreen 151 only from a preset region depending on a user or manufacturer setup. In particular, the controller 180 is able to control the information to be scrolled at the second speed until the user interested information having appeared on the preset region of the touchscreen 151 disappears from the preset region of the touchscreen 151.

With reference to FIG. 11 (a) and FIG. 11 (b), a case that a full region of the touchscreen 151 is set as the preset region 1101 is described. In particular, referring to FIG. 11 (a) and FIG. 11 (b), after a list 402 has started to be scrolled at a first speed in the same manner described with reference to FIG. 7 and FIG. 8, if it is detected that a contact 701 corresponding to a user interested information is displayed on a full region of the touchscreen 151, the controller 180 is able to control a scroll speed to be changed into a second speed. As information is scrolled, FIG. 11 (a) illustrates that the contact 701 is displayed on a region 1101 of the touchscreen 151. And, FIG. 11 (b) illustrates a process for the contact to disappear from the region 1101. In this case, the controller 180 can control the list 402 to start to be scrolled at the second speed in the region 1101.

With reference to FIG. 11 (c) and FIG. 11 (d), a case that a partial region of the touchscreen 151 is set as the preset region 1102. In particular, FIG. 11 (c) and FIG. 11 (d) show one example of a case that the preset region 1102 is located on a middle part of the touchscreen 151.

Referring to FIG. 11 (c), as the list 402 is scrolled, the controller 180 can detect that the contact 701 corresponding to the user interested information enters the preset region 1102. In doing so, the controller 180 can control a partial region 1103 of a cell configuring the contact 701 to enter the preset region 1102. In doing so, until the contact 701 enters the preset region 102, a scroll speed is being decelerated at a preset rate since starting at the first speed like the former speed 411 shown in FIG. 7 (b). As the contact 701 enters the region 1102, the controller 180 can control the scroll speed to be changed into the second speed. In particular, as the user interested information enters the region 1102, the scroll speed of the list 402 is reduced.

Referring to FIG. 11 (d), as the list 402 continues to be scrolled, the controller 180 can detect that the contact 702 is moving away from the region 1102 by being scrolled. In FIG. 11 (d), before the contact 701 moves away from the region 1102, a partial region 1104 of the cell configuring the contact 701 is included in the region 1102. In doing so, the controller 180 controls the list 402 to be scrolled at the second speed. In particular, in case that at least one portion of the contact 701 is included in the region 1102, the controller 180 can control the list 402 to be scrolled at the second speed. If the contact 701 completely moves away from the region 102, the controller 180 can control the scroll speed of the list 402 to be changed again into a speed, which results from deceleration at a preset rate in case of continuing the scroll at the first speed like the former speed 707 shown in FIG. 7 (c), from the second speed.

Figure 12:
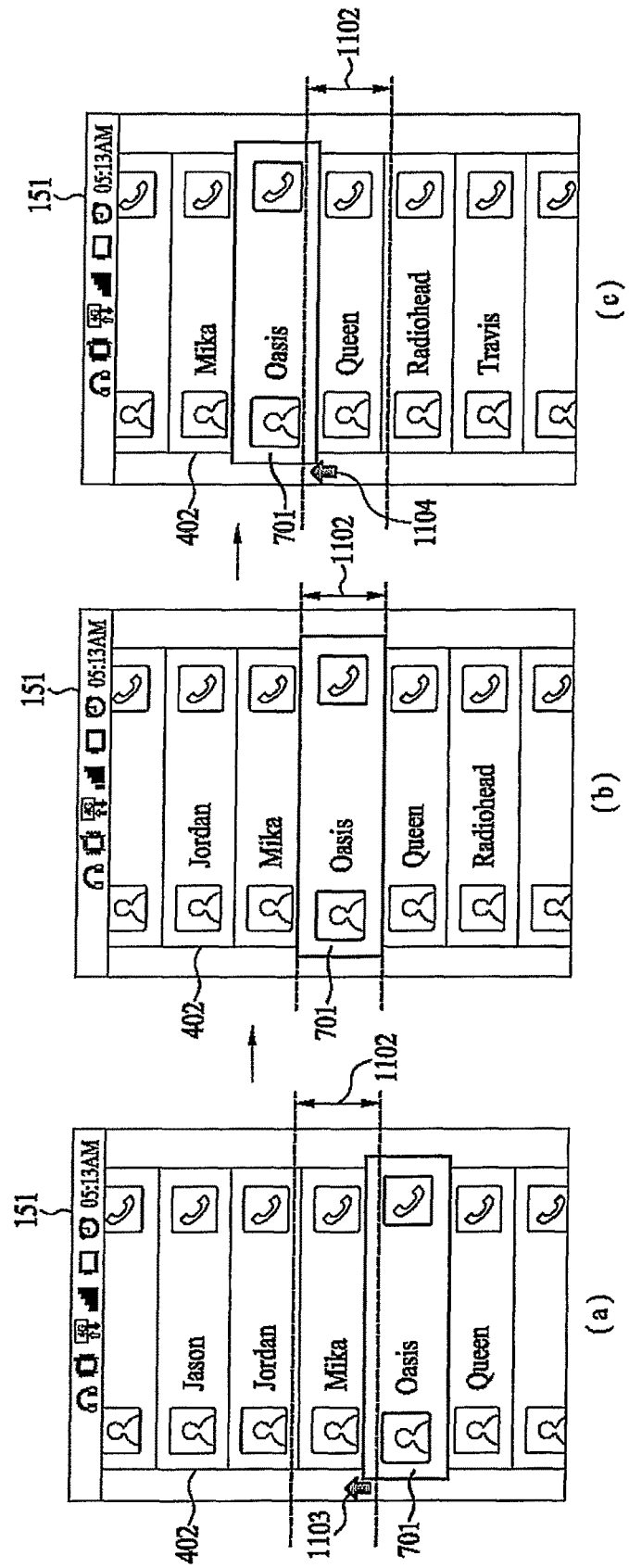
FIG. 12 is a diagram for one example to describe a region for performing a visual identification processing on a user interested information according to an embodiment of the present invention.

FIG. 12 is a diagram for one example to describe a region for performing a visual identification processing on a user interested information according to an embodiment of the present invention. Particularly, as one example of the visual identification processing, the popup effect described with reference to FIG. 10 is shown in FIG. 12. Moreover, like the example shown in FIG. 11, a region in the middle part of the touchscreen 151 is previously set as a region in which a moving speed of the user interested information is adjusted.

Referring to FIG. 12 (a), as a list 402 is scrolled in a direction of a top end of the touchscreen 151, the controller 180 can control a contact 701 to enter a region 1102. In doing so, as a partial region 1103 of a cell configuring the contact 701 enters the region 1102, the controller 180 can control the contact 701 to be displayed in a manner of popping up. Referring to FIG. 12 (b), the contact 701 is included in the region 1102 in a manner of being processed into being visually identifiable as a popup effect when the list 402 is scrolled. Referring to FIG. 12 (c), as the list 402 continues to be scrolled, the controller 180 can control the contact 701 to move away from the region 1102. Before the contact 701 moves away from the region 1102, a partial region 1104 of the cell configuring the contact 701 is included in the region 1102. Until the contact 701 fully moves away from the region 1102, the controller 180 can control the popup effect to be maintained. While the list 402 is scrolled from the example shown in FIG. 12 (a) to the example shown in FIG. 12 (c), the controller 180 can control the scroll speed to be maintained at a second speed.

Figure 13:
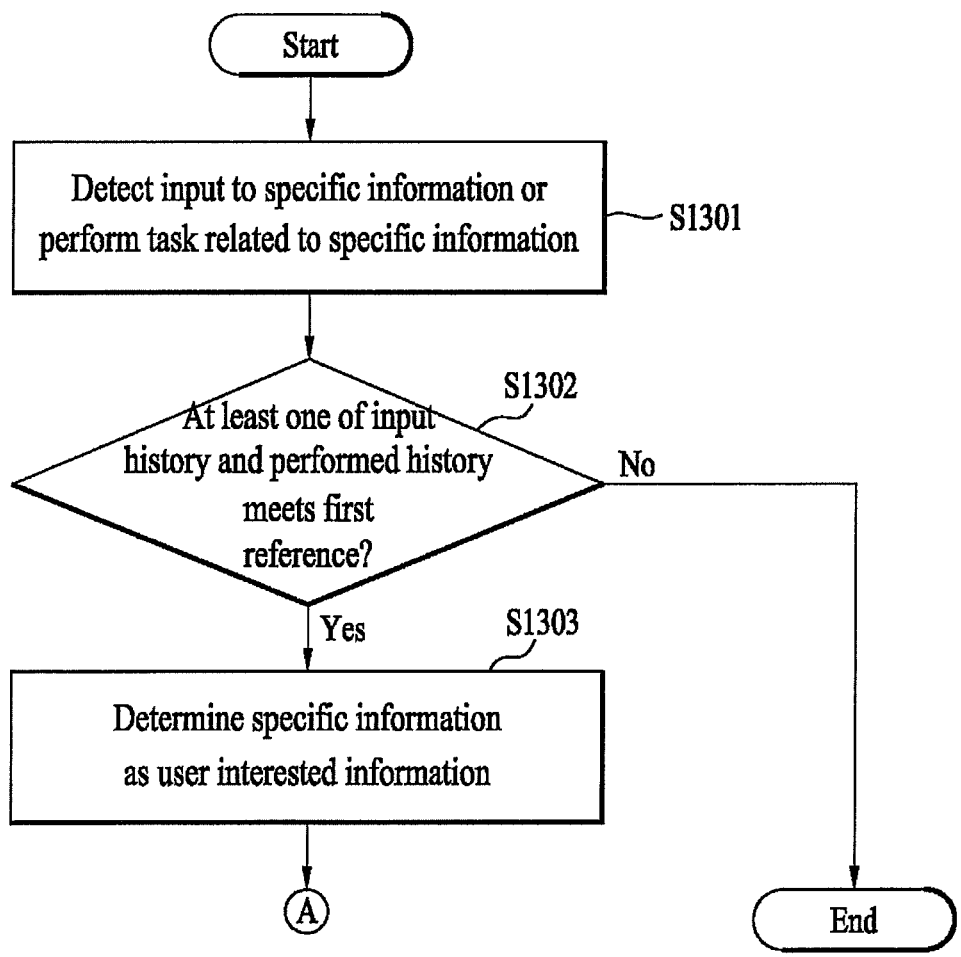
FIG. 13 is a flowchart to describe a process for determining a user interested information according to an embodiment of the present invention.

FIG. 13 is a flowchart to describe a process for determining a user interested information according to an embodiment of the present invention. And, FIG. 14 is a diagram for one example to describe a process for inputting a specific information and performing a task related to the specific information according to an embodiment of the present invention.

Referring to FIG. 13, the controller 180 can detect an input for a specific information and is able to perform a task related to the specific information [S1301]. In this case, the specific information can include all targets that can be inputted by a user in relation with functions of the mobile terminal 100. And, the specific information can include all targets that can be selected by user's touch gestures from objects displayed through the touchscreen 151. Moreover, the specific information can include all targets used in a process for activating an application that can be launched through the controller 180.

For instance, referring to FIG. 14 (a), in response to a user's activation command, the controller 180 can control an internet webpage 1401 for a search to be displayed on the touchscreen 151. In this case, the webpage 1401 includes a search window 1402. If a user's touch gesture is inputted to the search window 1402, the controller 180 can control a keyboard 1403 for a search word input to be displayed on the touchscreen 1403. The user is able to input a search word to the search window 1402 through the keyboard 1403. In response to the user's input, the controller 180 can control a search word 1404 to be displayed on the search window 1402. The controller 180 is able to detect that the search word 1404 has been inputted through the touchscreen 151. In this case, the search word 1404 corresponds to one example of the specific information.

Referring to FIG. 14 (b), in response to a user's activation command, the controller 180 can control a music player 1406 for a music play to be displayed on the touchscreen 151. In particular, the controller 180 is able to control a specific music 1407 to be played through the music player 1406. In this case, a related information 1408 of the specific music, i.e., an information such as a title, a singer and the like can correspond to one example of the specific information. The controller 180 controls the music 1407 to be played and is also able to detect the related information 1408 of the music 1407.

Referring to FIG. 14 (c), in response to a user's activation command, the controller 180 can control an internet portal site 1409 for a search to be displayed on the touchscreen 151. If the user selects a hyperlink 1410 for a specific news through a touch gesture, the controller 180 accesses a webpage, by which the specific news is provided, through the wireless communication unit 110 and is then able to control a corresponding news article to be displayed. In this case, an information (e.g., a summary, a title, etc.) of the article included in the hyperlink 1410 can correspond to one example of the specific information. The controller 180 controls the hyperlink 1410 to be accessed and is also able to detect an information 1411 included in the hyperlink 1410.

Referring now to FIG. 13, the controller 180 can determine whether at least one of an input history for the specific information and a performed history of a task related to the specific information meets a preset first reference [S1302]. If the specific information is inputted as mentioned in the foregoing description with reference to FIG. 14 (a) or selected as mentioned in the foregoing description with reference to FIG. 14 (c), the controller 180 can determine it as an input for the specific information.

The controller 180 can determine whether the input history meets the first reference by determining a history such as a total count of inputs of the search word 1404, a inputted time interval in a plural-time inputs of the search word 1404, a frequency of inputs per month in a plural-time inputs of the search word 1404, an inputted timing point in a plural-time inputs of the search word 1404 and the like, a history such as a selected count of the hyperlink 1410 including the information 1411, and the like. Moreover, as mentioned in the foregoing description with reference to FIG. 14 (b), the controller 180 can determine whether the performed history meets the first reference by determining a history such as a launched count of the music player for the music 1407 corresponding to the related information 1408, a launched timing point of the music player and the like.

Furthermore, the controller 180 can determine whether the first reference is met by adding up the input history and the performed history.

The first reference can be determined by a user or manufacturer setup and may include a reference for a plurality of items. For instance, if a specific information is inputted or selected at least 5 times, the controller 180 can determine that the first reference is met. If a specific information is inputted or selected in a specific time slot, the controller 180 can determine that the first reference is met. Moreover, if a related task of a specific information is performed at least 5 times per week, the controller 180 can determine that the first reference is met. If a sum of an inputted count and a performed count of a specific information is determined as 10 times at least, the controller 180 can determine that the first reference is met.

As a result of the determination made in the step S1302, if at least one of the input history of the specific information and the performed history of the task related to the specific information meets the preset first reference, the controller 180 determines the specific information as a user interested information [S1303]. Thus, after the specific information has been determined as the user interested information, the former process including the steps S601 and the like shown in FIG. 6 can be performed.

Figure 15:
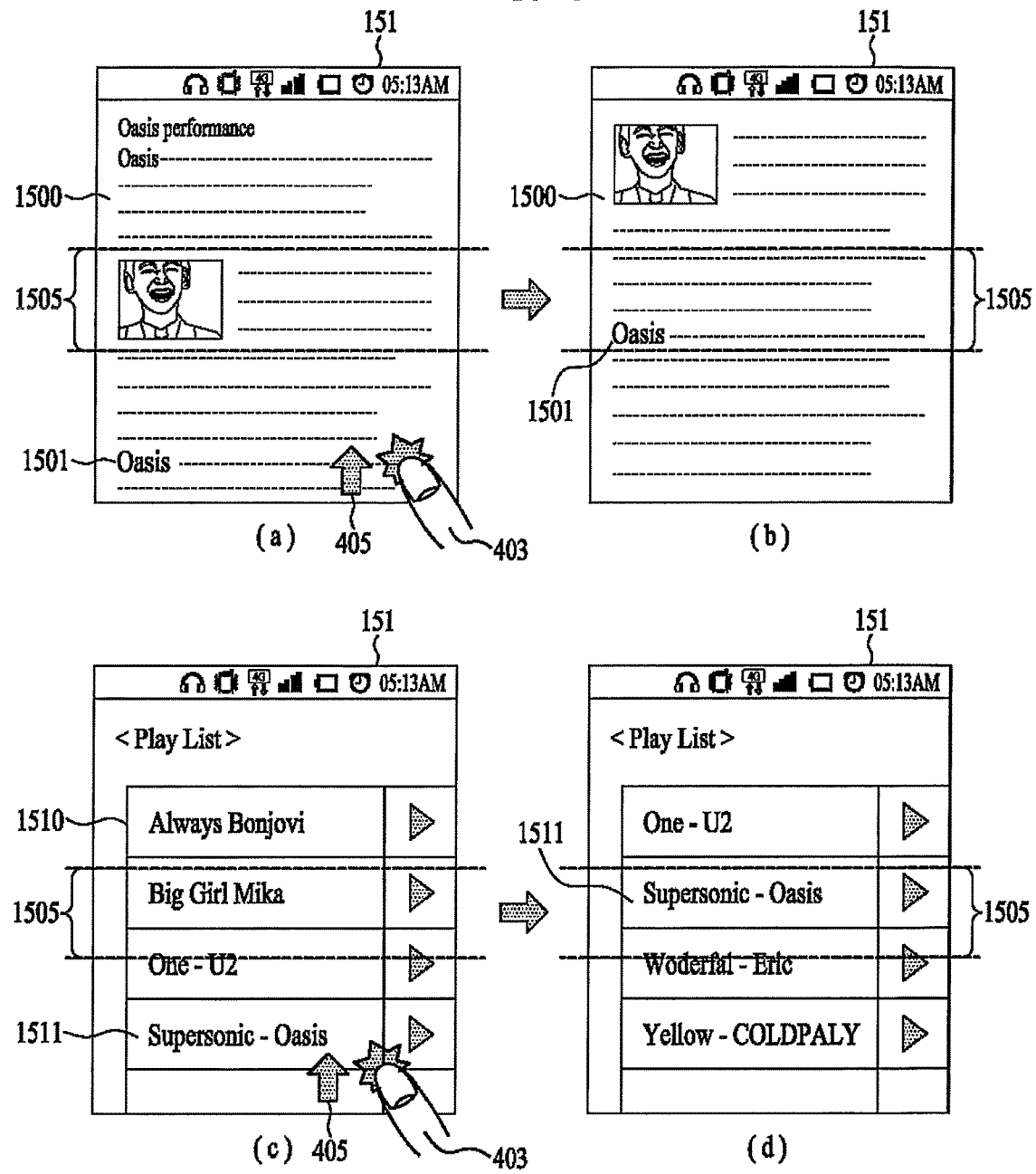
FIG. 15 is a diagram for one example to describe a scroll speed of information in case of displaying a user interested information determined in the former embodiment shown in FIG. 14.

FIG. 15 is a diagram for one example to describe a scroll speed of information in case of displaying a user interested information determined in the former embodiment shown in FIG. 14. For clarity of the description with reference to FIG. 15, as mentioned in the foregoing description with reference to FIG. 11 (c), the preset region includes a region 1505 located in the middle part of the touchscreen 151.

In the following description, a case that the controller 180 detects the specific information 1404/1408/1411 and then determines the user interested information owing to the met first reference in the former descriptions with reference to FIG. 13 and FIG. 14 is explained.

Referring to FIG. 15 (a), a specific article 1500 is displayed as an information of the present invention in a text format on the touchscreen 151. The controller 180 can control a scroll of the article 1500 to start at a first speed in a direction 405 by a user's flick input 403. In this case, the controller 180 is able to detect that a user interested information 1501 is displayed on the touchscreen 151. Referring to FIG. 15 (b), if the user interested information 1501 enters a region 1505, the controller 180 can control the scroll speed of the article 1500 to be changed into a second speed.

In doing so, although the article 1500 is provided through a webpage, it is not necessary for the user interested information to be determined by an input history. In particular, as mentioned in the foregoing description with reference to FIG. 14 (b), although the user interested information is determined through activation of a specific application, the controller 180 can detect a user interested target from the information 1500 differing from the specific application in attributes.

Referring to FIG. 15 (c), a play list 1510 is displayed as an information of the present invention on the touchscreen 151. The play list 1510 can be provided through the music player described with reference to FIG. 15 (b).

The controller 180 can control a scroll of the play list 1510 to start at a first speed in a direction 405 by a user's flick input 403. In this case, the controller 180 is able to detect that a user interested information 1511 is displayed on the touchscreen 151. Referring to FIG. 15 (d), if the user interested information 1511 enters a region 1511, the controller 180 can control the scroll speed of the play list 1510 to be changed into a second speed.

In doing so, although the play list 1510 is provided through the music player, it is not necessary for the user interested information to be determined by a performed history. In particular, as mentioned in the foregoing descriptions with reference to FIG. 14 (a) and FIG. 14 (b), although the user interested information is determined through an input to a specific webpage or a selection from a specific webpage, the controller 180 can detect a user interested target from the information 1510 differing from the specific webpage in attributes.

Figure 16:
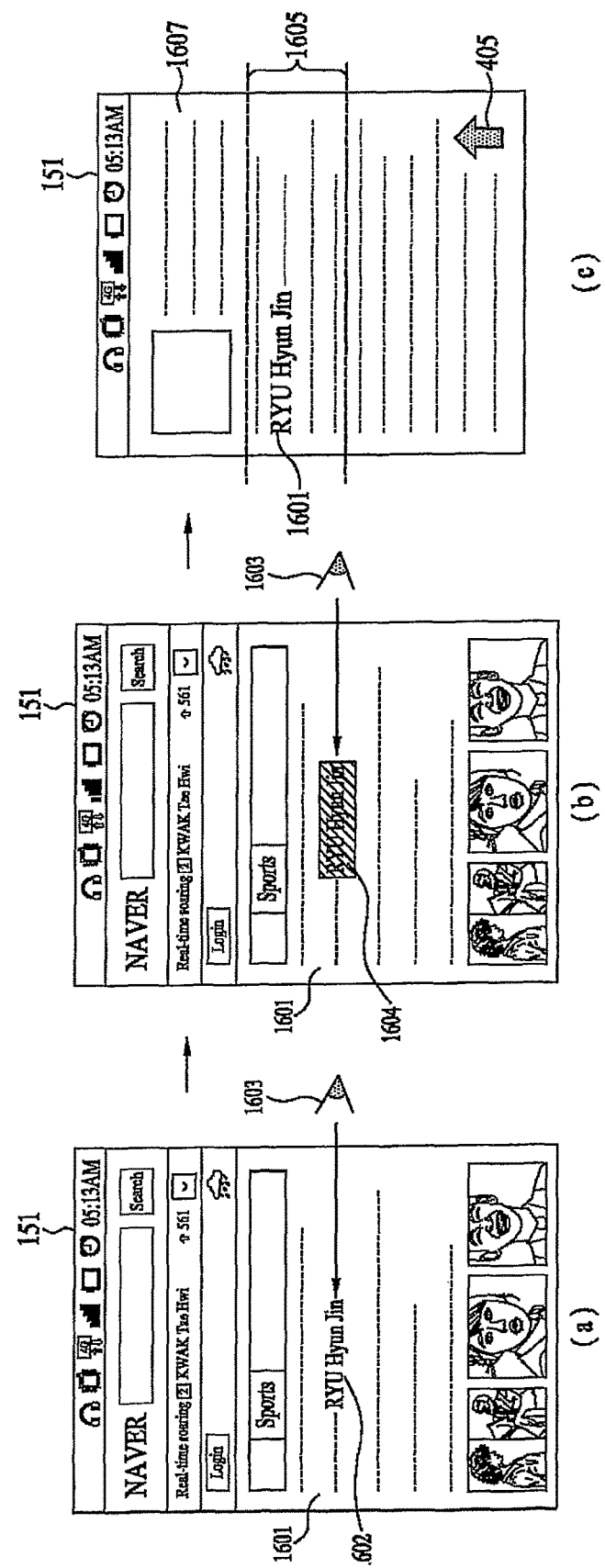
FIG. 16 is a diagram for one example to describe that a user interested information is determined depending on user eyes according to an embodiment of the present invention.

FIG. 16 is a diagram for one example to describe that a user interested information is determined depending on user eyes according to an embodiment of the present invention. In FIG. 16, a webpage 1601 of an internet portal site is illustrated as one example of information of the present invention and the webpage 1601 includes a specific information 1602.

According to an embodiment of the present invention, a method of determining a user interested information is non-limited by the method described with reference to FIG. 14. Referring to FIG. 13 and FIG. 16 (a), the controller 180 can control a user interested information to be determined by detecting user's eyes.

The controller 180 can control an information 1601 to be displayed on the touchscreen 151 and is able to detect user's eyes 1603. In particular, in FIG. 16 (a), the controller 180 can detect that the user's eyes face the specific information 1602. If the user's eyes facing the specific information 1602 is detected, the controller 180 can determine that the specific information 1602 has been selected in the same manner described with reference to FIG. 13 and FIG. 14 (c). In particular, the controller 180 can detect the user's eyes 1603 through an input to the specific information 1602 [S1301]. The mobile terminal 100 includes the camera 121 provided to the front side of the mobile terminal 100, as shown in FIG. 2, and the controller 180 is able to detect the user's eyes 1603 through the camera 121. Moreover, in case that the mobile terminal 100 includes another sensor capable of tracing the user's eyes 1603 as well as the camera 121, the controller 180 can detect the user's eyes using another sensor. In order to raise a recognition rate of the specific information 1602, the controller 180 can control a target, which is include in a plurality of regions having the user's eyes 1603 located in common thereat, to be recognized as the specific information 1602.

If the controller 180 recognizes the user's eyes 1603 as an input to the specific information 1602, the controller 180 determines whether at least one of an input history and a performed history meets a first reference [S1302]. In this case, the first reference can be preset by a user or manufacturer. For instance, a time for the user's eyes to stay at the specific information is equal to or greater than a determined time or a count of the user's eyes staying at the specific information 1602 is equal to or greater than a predetermined count, the controller 180 can determine that the input history meets the first reference.

In case that the input history meets the first reference, the controller 180 can determine the specific information 1602 as a user interested information.

Referring to FIG. 16 (b), if the specific information 1602 having the user's eyes located thereat meets the first reference, the controller 180 can control the specific information 1602 to be processed into being visually identifiable. In particular, the controller 180 controls the visual-identification processed specific information 1604 to be displayed so that the user can recognize that the specific information 1602 is determined as the user interested information.

Referring to FIG. 16 (c), if a hyperlink including a user-specific target 1602 is selected through a touch gesture, the controller 180 can control a webpage 1607 accessed through the hyperlink to be displayed through the touchscreen 151. In particular, in case that an information of the present invention is the webpage 1607, the controller 180 can control the webpage 1607 to be scrolled in a direction 405 by a user's scroll input. Moreover, in the description with reference to FIG. 16 (c), a case that a region 1605 located in the middle part of the touchscreen 151 is the preset region like the former region shown in FIG. 11 (c) is taken as an example.

The controller 180 is able to determine the specific information 1602 having the user's eyes 1603 located thereat as the user interested information. While the user interested information 1602 enters the region 1605 and then moves away from the region 1605, the controller 180 can control the scroll speed to be changed into a second speed.

The controller 180 can control a specific information to be determined as a user interested information by user's eyes on a specific webpage and may be able to control the specific information to be handled on the specific webpage and another webpage as the user interested information. Moreover, if a hyperlink including the user interested information is accessed, the controller 180 can stop the user interested information determining operation by the user's eyes. In particular, as a specific webpage 1607 is scrolled, when a user interested information is displayed by the controller 180, it is able to perform an operation of adjusting a scroll speed. In doing so, while the operation of adjusting the scroll speed is performed, the controller 180 can control an operation, which is performed to determine a different target having user's eyes located thereat as a user interested information, not to be performed.

On the other hand, in case that a user interested information is determined on a specific webpage, if the controller 180 detects that the user interested information is displayed again in the course of scrolling not a different webpage but the same webpage, the controller 180 can control the scroll to start at a second speed.

Figure 17:
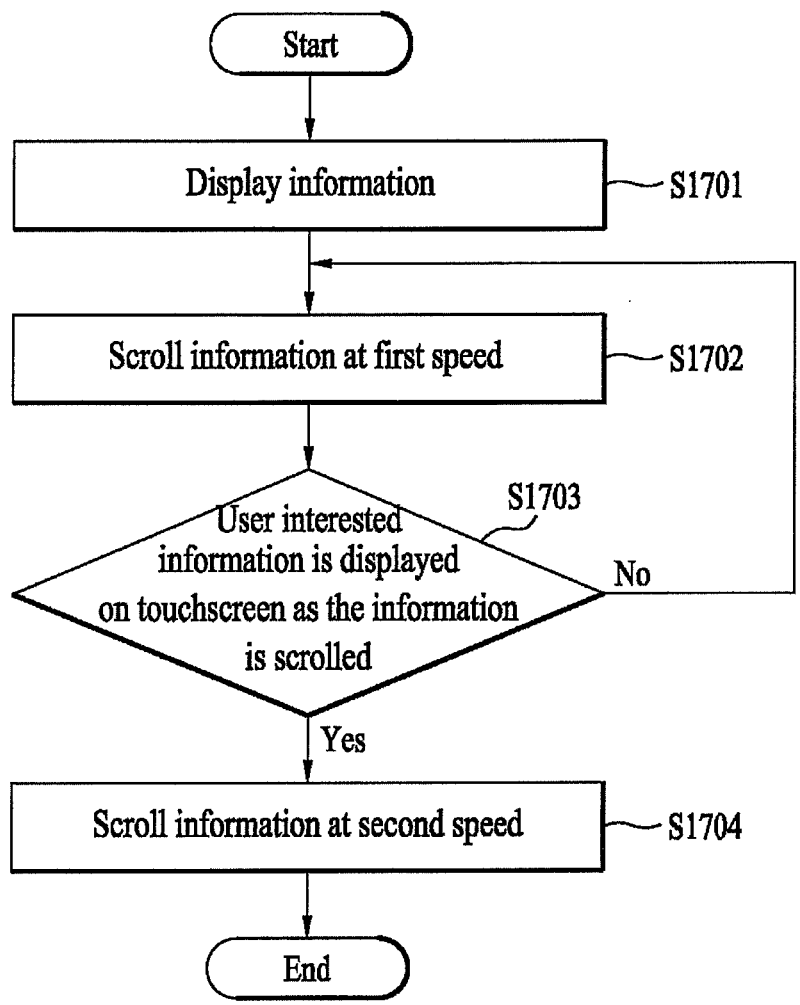
FIG. 17 is a flowchart for an operation of a mobile terminal according to another embodiment of the present invention.
Figure 18:
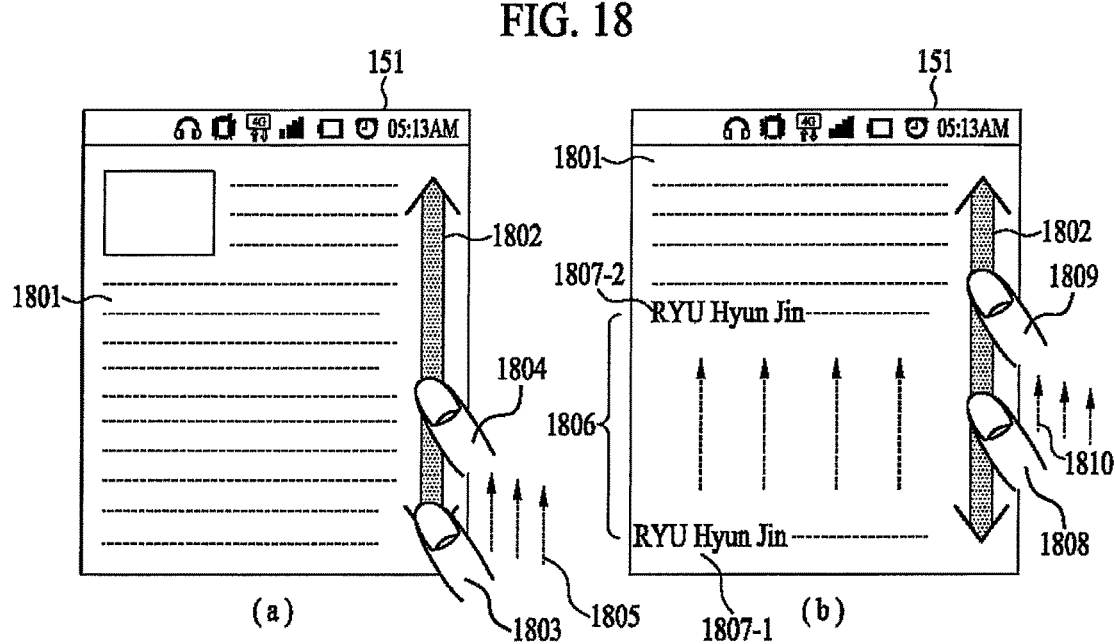
FIG. 18 is a diagram for one example to describe a scroll speed change depending on a movement of a user interested information according to another embodiment of the present invention.

FIG. 17 is a flowchart for an operation of a mobile terminal according to another embodiment of the present invention. And, FIG. 18 is a diagram for one example to describe a scroll speed change depending on a movement of a user interested information according to another embodiment of the present invention. Particularly, FIG. 18 shows a drag input as one example of a touch gesture of the present invention.

Referring to FIG. 17 and FIG. 18, the controller 180 can control an information 1801 to be displayed on the touchscreen 151 [S1701]. The controller 180 is able to control a scroll bar 1802 to be displayed on one lateral side of a region in which the information 1801 is displayed. The controller 180 can control the scroll bar 1802 to be displayed in a manner of overlapping the information 1801. And, the controller 180 can control the scroll bar 1802 to be displayed on a region except the information displayed region. In case that the scroll bar 1802 is displayed by overlapping, the controller 180 can control transparency of the scroll bar 1802 to be adjusted in accordance with a user or manufacturer setup.

The controller 180 can control the information to be scrolled at a first speed in response to a user's drag input [S1702]. In this case, the first speed means a speed of scrolling the information by a drag input applied with a predetermined strength by a user. For instance, referring to FIG. 18 (a), when a user applies a drag input to the scroll bar 1802 between a point 1803 and a point 1804 with a predetermined strength during a predetermined time, a speed 1805 of scrolling the information 1801 corresponds to the first speed.

As the information 1801 is scrolled at the first speed, the controller 180 is able to determine whether a user interested information is displayed [S1703]. If the user interested information is not displayed, the controller 180 can control the information 1801 to keep being scrolled at the first speed in response to a user drag input.

On the other hand, if the user interested information is displayed, the controller 180 can control the information 1801 to be scrolled at a second speed. Referring to FIG. 18 (*b*), as the touch drag continues to a point 1808 shown in FIG. 18 (*b*), the controller 180 can detect that a user interested information 1807-1 is displayed on a bottom end of the touchscreen 151. If it is detected that the user interested information 1807-1 is displayed, the controller 180 can control the scroll speed to be changed into a second speed [S1704]. In particular, although a user drag input is applied with the same strength of the drag input applied by the user on scrolling the information 1801 at the first speed 1805 like FIG. 18 (*a*), the controller 180 can control the information 1801 to be scrolled at a second speed 1810. If the second speed is lower than the first speed, when the user interested information 1807-1 is displayed on the touchscreen 151, the user interested information can be scrolled slower than the case shown in FIG. 18 (*a*) despite the user's drag input with the same strength.

For instance, while the user interested information 1701-1 is passing through a region 1806 from a point 1808 to a point 1809 in response to a drag input applied by the user, the controller 180 can control the information 1801 to be scrolled at the second speed 1810 lower than the first speed 1805.

Figure 19:
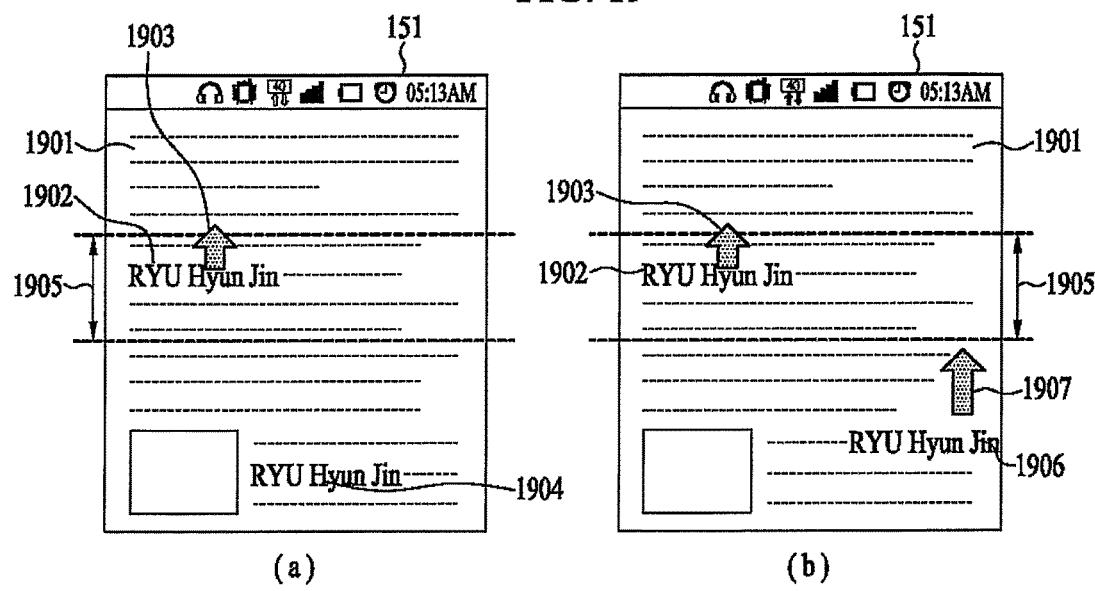
FIG. 19 is a diagram for one example to describe a scroll speed of information in case of displaying a plurality of user interested informations according to an embodiment of the present invention.

FIG. 19 is a diagram for one example to describe a scroll speed of information in case of displaying a plurality of user interested informations according to an embodiment of the present invention. FIG. 19 shows a case that a plurality of user interested informations are displayed on an information 1901. In FIG. 19, assume that the information 1901 is scrolled in a direction of a top end of the touchscreen 151. For clarity of the following description, a case that a region 1905 located in the middle part of the touchscreen 151 is the predetermined region like FIG. 11 (*c*) is taken as one example.

Referring to FIG. 19 (*a*), since a user interested information 1902 is included in a region 1905, the controller 180 can control the information 1901 to be scrolled at a second speed. In doing so, if the user interested information 1902 is scrolled by a distance 1903, it moves away from the region 1905. In this case, the controller 180 can change a speed of scrolling the information 1901 into the former speed 707 described with reference to FIG. 7 (*d*). Although the user interested information 1902 moves away from the region 1905, a different user interested information 1904 is unable to enter the region 1905. In particular, even if the different user interested information 1904 is scrolled by the distance 1903, it is unable to enter the region 1905. In this case, until the user interested information 1904 enters the region 1905, the controller 180 controls the information to be scrolled at the speed 707. Thereafter, if the user interested information 1904 enters the region 1905, the controller 180 can control the information 1901 to be scrolled at the second speed.

Referring to FIG. 19 (*b*), like FIG. 19 (*a*), since a user interested information 1902 is included in a region 1905, the controller 180 can control an information 1901 to be scrolled at a second speed.

In doing so, if the user interested information 1902 is scrolled by a distance 1903, it moves away from the region 1905. As the information 1902 is scrolled by the distance 1903, when the user interested information 1902 moves away from the region 1905, if a different user interested information 1906 enters the region 1905, the controller 180 can control a speed of scrolling the information 1901 to be maintained at a second speed. Moreover, when a distance to the region 1905 is a distance 1907, although the distance 1907 is longer than the former distance 1903, the controller 180 can control the scroll speed of the information 1901 to be maintained at the second speed. In particular, as the user interested information 1906 is scrolled by the distance 1903, even if the user interested information 1906 is unable to enter the region 1905, the controller 180 can control the second speed to be maintained.

In accordance with a user or manufacturer setup, the above-mentioned embodiment is applicable to a case that the distance 1907 is longer than the distance 1903 by a prescribed distance. In particular, when the different user interested information 1906 approaches the region 1905 in a prescribed range, although the user interested information 1902 has moved away from the region 1905, the controller 180 does not change the scroll speed of the information 1901 into the speed 707. Through the above embodiment, the controller 180 can be set not to change the scroll speed too frequently.

Figure 20:
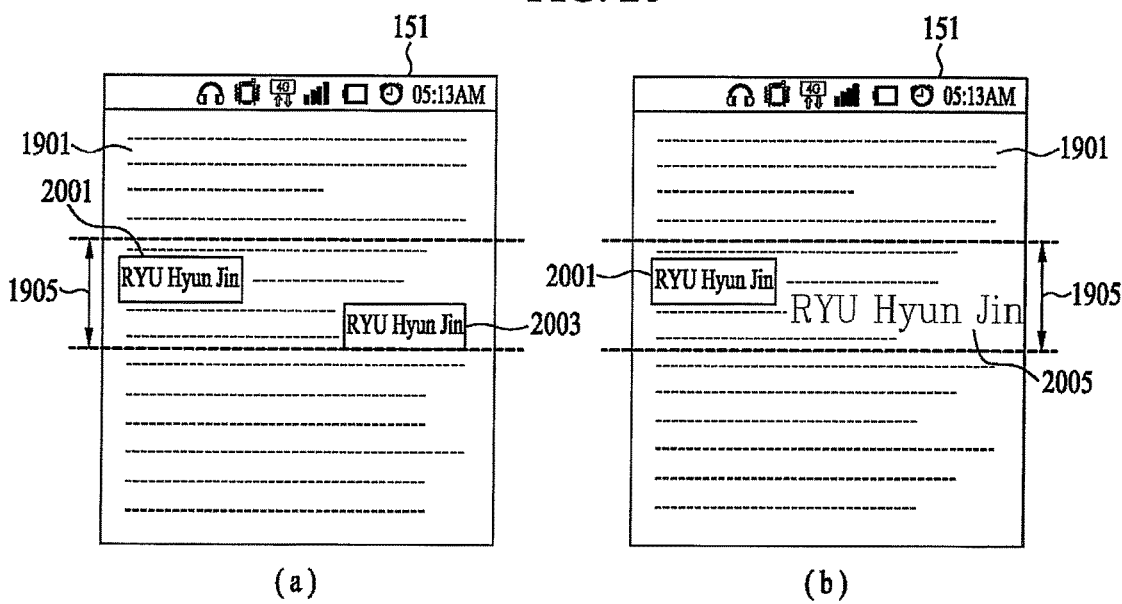
FIG. 20 is a diagram for one example to describe a visual identification processing in case of displaying a plurality of user interested informations according to an embodiment of the present invention.

FIG. 20 is a diagram for one example to describe a visual identification processing in case of displaying a plurality of user interested informations according to an embodiment of the present invention.

Like the case shown in FIG. 19, FIG. 20 shows a case that a plurality of user interested informations are displayed on an information 1901. A case that a region 1905 located in the middle part of the touchscreen 151 is the predetermined region like FIG. 11 (*c*) is taken as one example. And, a case that a plurality of user interested informations are included in the region 1905 at the same time is taken as one example.

Referring to FIG. 20 (*a*), in case that two user interested informations are included in a region 1905, the controller 180 can control the two user interested informations to be displayed through the touchscreen 151 in a manner of being visually and identifiably processed into the same forms 2001 and 2003. In this case, the user interested information is processed visually and identifiably to have an outline effect on its circumference.

Referring to FIG. 20 (*b*), in case that two user interested informations are included in a region 1905, the controller 180 can control the two user interested informations to be displayed through the touchscreen 151 in a manner of being visually and identifiably processed into different forms 2001 and 2005. In particular, the user interested information 2005 is processed visually and identifiably in a manner of being displayed by being emphasized in bold style.

Meanwhile, in the above description, a case that a second speed is slower than a first speed is mainly explained. Hence, a case that the controller 180 controls a scroll speed of information to be decelerated is described. Yet, in case that a specific information, which meets a preset second reference is displayed on the touchscreen 151, the controller 180 can control a scroll speed to be accelerated instead. In particular, if a specific information meets a second reference, the controller 180 can determine the specific information as a user uninterested information. If the user uninterested information is displayed on the touchscreen 151, the controller 180 can control a scroll speed to be set to a third speed. In this case, the third speed is higher than the first speed.

Moreover, if at least one of a count of inputs to the specific information and a count of performing a task related to the specific information is smaller than a preset count, the controller 180 can determine that the second reference is met.

Accordingly, embodiments of the present invention provide various effects and/or features.

First of all, in a mobile terminal according to an embodiment of the present invention, as information displayed on a display unit is scrolled, if a user interested information included in the displayed information is displayed on the display unit, a user can be provided with convenience in accessing the user interested information by scrolling the corresponding information slowly in a manner of adjusting a scroll speed.

Secondly, a mobile terminal according to the present invention facilitates a user to check a user interested information in a manner of processing the user interested information to be visually identifiable on a display unit in the course of scrolling information.

Thirdly, using a mobile terminal according to the present invention, a target inputted by a user, a target detected as having user's eyes focused thereon or the like can be determined as user interested information depending on a preset condition. Hence, the user can select a target of which scroll speed is adjusted when an information displayed on a mobile terminal according to the present invention is scrolled.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a touchscreen configured to display information; and
a controller configured to receive a user input for scrolling, to control scrolling of the displayed information at a first speed based on the user input for scrolling,
wherein after scrolling of the information begins, the controller to control the scrolling of the information to decelerate from the first speed at a prescribed rate, and
when a user interested information in the information is displayed in a preset region on the touchscreen while the information is scrolled, the controller to control the scrolling of the information at a second speed,
wherein when a first user interested information is displayed in the preset region, the controller is configured to control the information to be scrolled at the second speed, and when the first user interested information is moved to outside the preset region and a second user interested information is displayed on the information outside the preset region within a prescribed range, the controller is configured to control the information to be scrolled at the second speed at least until the second user interested information enters the preset region even though the first user interested information outside of the preset region,
wherein when the first user interested information and the second user interested information are both simultaneously displayed in the preset region, the controller is configured to control one of the first and second user interested informations to be displayed in a manner of being visually and identifiably different from display of the other one of the first and second user interested information.

2. The mobile terminal of claim 1, wherein the second speed is less than a speed resulting from the scrolling to decelerate from the first speed at the prescribed rate until the user interested information is displayed on the touchscreen.

3. The mobile terminal of claim 1, wherein the controller controls the scrolling of the information to decelerate from the first speed at the prescribed rate with a lapse of time.

4. The mobile terminal of claim 1, wherein when the user interested information is displayed at the preset region on the touchscreen while the information is scrolled, the controller to control scrolling of the information at the second speed until the user interested information is scrolled out of the preset region of the touchscreen.

5. The mobile terminal of claim 4, wherein when the first user interested information located in the distance of a preset range is detected and the second user interested information located in the distance of the preset range is detected, the controller to control the information to be scrolled at the second speed until the second user interested information is scrolled out of the preset region after the first user interested information is in the preset region.

6. The mobile terminal of claim 5, wherein while the information is scrolled, and both a first user interested target and a second user interested target are simultaneously displayed in the preset region, the controller to differently display the first user interested target and the second user interested target.

7. The mobile terminal of claim 1, wherein when the user interested information is displayed on the touchscreen while the information is scrolled, the controller to distinguishably display the user interested information on the touchscreen.

8. The mobile terminal of claim 7, wherein the user interested information is visually distinguished on the touchscreen by at least one selected from the group consisting of a highlight effect, an enlargement effect and a popup effect.

9. The mobile terminal of claim 1, wherein when at least one of an input history for a specific information and a history of a task related to the specific information satisfies a preset reference, the controller to determine the specific information as the user interested information.

10. The mobile terminal of claim 1, wherein when a specific information satisfying a preset reference and included in the information is determined to be on the touchscreen, the controller to control scrolling of the information at a third speed.

11. The mobile terminal of claim 10, wherein when one of a count of inputs to the specific information and a count of performing a task related to the specific information is less than a preset count, the controller to determine that the preset reference is satisfied.

12. The mobile terminal of claim 1, further comprising a camera configured to detect a location of a user's eyes,
wherein when one of a time and a count of the user's eyes to stay at a target on the touchscreen satisfies a preset condition, the controller to determine the target as the user interested information.

13. A mobile terminal comprising:
a touchscreen configured to display information; and
a controller configured to control the information to begin to be scrolled at a first speed when a touch drag having a prescribed strength on the touchscreen is maintained, and
when a user interested information in the information is displayed at a preset region on the touchscreen as the information is scrolled, the controller to change a scrolling speed of the information from the first speed to a second speed,
wherein when a first user interested information is displayed at the preset region, the controller is configured to control the information to be scrolled at the second speed, and when the first user interested information is moved to outside the preset region and a second user interested information is displayed on the information outside the preset region within a prescribed range, the controller is configured to control the information to be scrolled at the second speed until the second user interested information enters the preset region even though the first user interested information is outside of the preset region,
wherein when the first user interested information and the second user interested information are both simultaneously displayed at the preset region, the controller is configured to control one of the first and second user interested informations to be displayed in a manner of being visually and identifiably different from display of the other one of the first and second user interested information.

14. The mobile terminal of claim 13, wherein the second speed is less than a speed resulting from the scrolling to decelerate from the first speed at a prescribed rate until the user interested information is displayed on the touchscreen.

15. The mobile terminal of claim 13, wherein the controller controls the scrolling of the information to decelerate from the first speed at a prescribed rate with a lapse of time.

16. The mobile terminal of claim 13, wherein when the user interested information is displayed at the preset region on the touchscreen while the information is scrolled, the controller to control scrolling of the information at the second speed until the user interested information is scrolled out of the preset region of the touchscreen.

17. The mobile terminal of claim 13, wherein when the user interested information is displayed on the touchscreen while the information is scrolled, the controller to distinguishably display the user interested information on the touchscreen.

18. A method of controlling a mobile terminal, comprising:
displaying information on a display;
receiving a user input for scrolling the information;
scrolling the information at a first speed in response to the user input for scrolling;
when a user interested information in the information is displayed in a preset region on the display while the information is being scrolled, scrolling the information at a second speed;
when a first user interested information is displayed in the preset region, controlling the information to be scrolled at the second speed, and when the first user interested information is moved to outside the preset region and a second user interested information is displayed on the information outside the preset region within a prescribed range, controlling the information to be scrolled at the second speed until the second user interested information enters the preset region even though the first user interested information is outside of the preset region, and
wherein when the first user interested information and the second user interested information are both simultaneously displayed in the preset region, controlling one of the first and second user interested informations to be displayed in a manner of being visually and identifiably different from display of the other one of the first and second user interested information forms.

19. The method of claim 18, wherein scrolling the information at the first speed includes decelerating the scrolling of the information from the first speed at a prescribed rate.

20. The method of claim 19, wherein the second speed is less than a speed resulting from the scrolling to decelerate from the first speed at the prescribed rate until the user interested information is displayed on the display.

21. The method of claim 18, wherein when the user interested information is displayed at the preset region on the touchscreen while the information is scrolled, scrolling of the information at the second speed until the user interested information is scrolled out of the preset region of the touchscreen.

22. The method of claim 18, wherein when the user interested information is displayed on the touchscreen while the information is scrolled, the controller to distinguishably display the user interested information on the touchscreen.

23. The method of claim 18, wherein when at least one of an input history for a specific information and a history of a task related to the specific information satisfies a present reference, the specific information is determined as the user interested information.

* * * * *